United States Patent
Muto

(10) Patent No.: US 12,098,241 B2
(45) Date of Patent: Sep. 24, 2024

(54) THERMOPLASTIC RESIN COMPOSITION AND MOLDED ARTICLE

(71) Applicant: MITSUBISHI CHEMICAL CORPORATION, Tokyo (JP)

(72) Inventor: Fumihiro Muto, Hiratsuka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 626 days.

(21) Appl. No.: 17/288,767

(22) PCT Filed: Nov. 25, 2019

(86) PCT No.: PCT/JP2019/046028
§ 371 (c)(1),
(2) Date: Apr. 26, 2021

(87) PCT Pub. No.: WO2020/111011
PCT Pub. Date: Jun. 4, 2020

(65) Prior Publication Data
US 2021/0395447 A1  Dec. 23, 2021

(30) Foreign Application Priority Data

Nov. 26, 2018 (JP) .................................. 2018-220556
Nov. 26, 2018 (JP) .................................. 2018-220557

(Continued)

(51) Int. Cl.
*C08G 63/183* (2006.01)
*C08K 3/26* (2006.01)
(Continued)

(52) U.S. Cl.
CPC .............. *C08G 63/183* (2013.01); *C08K 3/26* (2013.01); *C08K 3/34* (2013.01); *C08K 5/0066* (2013.01);
(Continued)

(58) Field of Classification Search
CPC ........ C08G 3/183; C08G 63/183; C08K 3/26; C08K 3/34; C08K 5/0066;
(Continued)

(56) References Cited

U.S. PATENT DOCUMENTS 9,353,259 B2 *  5/2016  Yu ........................... C08L 67/02

FOREIGN PATENT DOCUMENTS

CN          106009554 A    10/2016
EP          0 376 616 A2   7/1990
(Continued)

OTHER PUBLICATIONS

English Machine Translation of JP 2000204210 (A) obtained on Dec. 1, 2023 from https://worldwide.espacenet.com/publicationDetails/biblio?CC=JP&NR=2000204210A&KC=A&FT=D&ND=3&date=20000725&DB=&locale=en_EP (Year: 2000).*
English Machine Translation of JP 2003206396 (A) obtained on Dec. 1, 2023 from https://worldwide.espacenet.com/publicationDetails/biblio?II=1&ND=3&adjacent=true&locale=en_EP&FT=D&date=20030722&CC=JP&NR=2003206396A&KC=A (Year: 2003).*
(Continued)

*Primary Examiner* — Ling Siu Choi
*Assistant Examiner* — Olga Lucia Donahue
(74) *Attorney, Agent, or Firm* — Oblon, McClelland, Maier & Neustadt, L.L.P.

(57) ABSTRACT

A thermoplastic resin composition that contains, based on 100 mass parts for a total of (A) and (B), at least 20 mass parts but less than 50 mass parts of (A) a polyalkylene terephthalate resin and more than 50 mass parts and not more than 80 mass parts of (B) a polystyrene resin or a rubber-reinforced polystyrene resin, wherein an intrinsic viscosity ($IV_A$) of the polyalkylene terephthalate resin (A) is 0.3 to 0.8 dl/g and a melt viscosity ($\eta_B$) of the polystyrene resin or rubber-reinforced polystyrene resin (B) at 250° C. and 912 sec$^{-1}$ is at least 80 Pa·sec.

20 Claims, 1 Drawing Sheet

(30) Foreign Application Priority Data

| | | |
|---|---|---|
| Mar. 13, 2019 | (JP) | 2019-045583 |
| Apr. 15, 2019 | (JP) | 2019-076889 |
| Apr. 15, 2019 | (JP) | 2019-076890 |

(51) Int. Cl.
| | |
|---|---|
| *C08K 3/34* | (2006.01) |
| *C08K 5/00* | (2006.01) |
| *C08K 7/06* | (2006.01) |
| *C08K 7/14* | (2006.01) |
| *C08L 25/06* | (2006.01) |
| *C08L 25/10* | (2006.01) |
| *C08L 25/14* | (2006.01) |
| *C08L 69/00* | (2006.01) |

(52) U.S. Cl.
CPC ............... *C08K 7/06* (2013.01); *C08K 7/14* (2013.01); *C08L 25/06* (2013.01); *C08L 25/10* (2013.01); *C08L 25/14* (2013.01); *C08L 69/00* (2013.01); *C08K 2003/265* (2013.01); *C08K 2201/003* (2013.01); *C08K 2201/016* (2013.01); *C08L 2201/02* (2013.01); *C08L 2201/08* (2013.01); *C08L 2203/20* (2013.01); *C08L 2205/03* (2013.01)

(58) Field of Classification Search
CPC ........ C08K 2003/265; C08K 2201/003; C08K 2201/016; C08L 25/06; C08L 25/10; C08L 25/14; C08L 69/00; C08L 2201/02; C08L 2201/08; C08L 2203/20; C08L 2205/03
See application file for complete search history.

(56) References Cited

FOREIGN PATENT DOCUMENTS

| | | | |
|---|---|---|---|
| JP | 62-74949 | A | 4/1987 |
| JP | 2-321 43 | A | 2/1990 |
| JP | 2-173047 | A | 7/1990 |
| JP | 11-152397 | A | 6/1999 |
| JP | 2000-204210 | A | 7/2000 |
| JP | 2003-206396 | A | 7/2003 |
| JP | 2006-16559 | A | 1/2006 |
| JP | 2007-31 4619 | A | 12/2007 |
| JP | 2008-106136 | A | 5/2008 |
| JP | 2009-96969 | A | 5/2009 |
| JP | 2013-144767 | A | 7/2013 |
| JP | 2014-133790 | A | 7/2014 |
| JP | 2016-183294 | A | 10/2016 |
| WO | WO 2015/037238 | A1 | 3/2015 |

OTHER PUBLICATIONS

English Machine Translation of JP 2014133790 (A) obtained on Dec. 1, 2023 from https://worldwide.espacenet.com/publicationDetails/biblio?CC=JP&NR=2014133790A&KC=A&FT=D&ND=3&date=20140724&DB=&locale=en_EP (Year: 2014).*

International Search Report issued on Feb. 4, 2020 in PCT/JP2019/046028 filed on Nov. 25, 2019, citing references AJ-AU therein, 3 pages.

Extended European Search Report issued Jun. 29, 2022 in European Patent Application No. 19889580.7, citing reference AO therein, 6 pages.

Notice of Reasons for Refusal issued Sep. 1, 2022 in Japanese Patent Application No. 2019-076890 (with English language translation), citing document 15 therein, 8 pages.

Japanese Office Action issued on Dec. 27, 2022, in the Japanese Patent Application No. 2018-220556 with English Translation citing reference 15 therein, 6 pages.

* cited by examiner

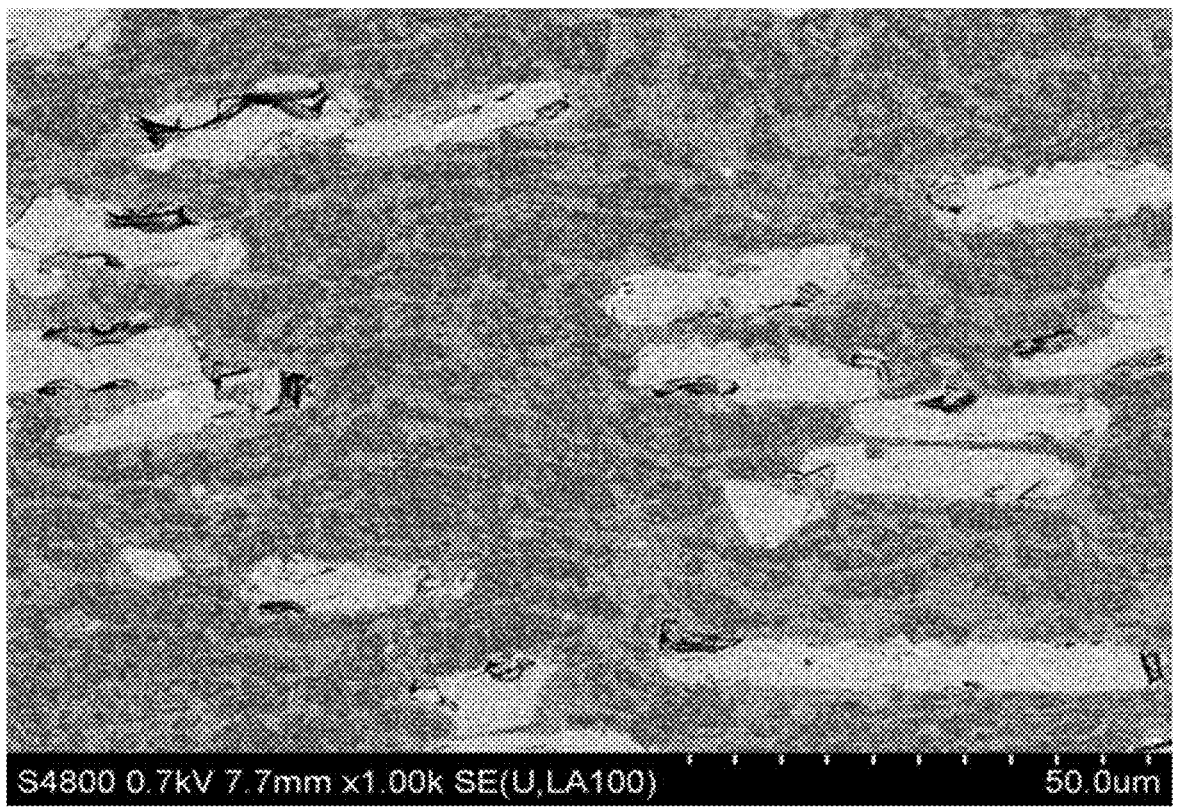

THERMOPLASTIC RESIN COMPOSITION AND MOLDED ARTICLE

CROSS-REFERENCE TO RELATED APPLICATIONS

The present application is the national stage of international application PCT/JP2019/046028, filed on Nov. 25, 2019, and claims the benefit of the filing date of Japanese Appl. No. 2018-220556, filed on Nov. 26, 2018, Japanese Appl. No. 2018-220557, filed on Nov. 26, 2018, Japanese Appl. No. 2019-045583, filed on Mar. 13, 2019, Japanese Appl. No. 2019-076889, filed on Apr. 15, 2019, and Japanese Appl. No. 2019-076890, filed on Apr. 15, 2019.

TECHNICAL FIELD

The present invention relates to a thermoplastic resin composition and a molded article and more particularly relates to a highly heat-resistant thermoplastic resin composition that exhibits an excellent low-warp behavior and appearance and an excellent mechanical strength, chemical resistance, and flame retardancy, and to a molded article composed of this thermoplastic resin composition.

BACKGROUND ART

Thermoplastic polyester resins, as represented by polybutylene terephthalate and polyethylene terephthalate, exhibit excellent mechanical strength, chemical resistance, electrical insulating behavior, and so forth, and as a consequence are widely used for parts for electrical and electronic devices, automotive interior and exterior parts and electrical equipment parts, mechanical parts, and so forth.

However, polybutylene terephthalate resins are crystalline resins and as a consequence exhibit a large mold shrinkage, and, particularly when a reinforcing filler such as glass fiber is incorporated, their anisotropy tends to become large and warping of the molded article may occur. Thus, methods have been proposed in which various amorphous resins are admixed in order to reduce warping.

PTL 1 describes an invention in which an excellent flowability, dimensional accuracy, and heat resistance are exhibited by a polyester resin composition provided by incorporating in (A) a resin, which is composed of: 50 to 96 wt % of (a) a polyester resin; 35 to 3 wt % of (b) a rubber-modified polystyrene resin; and 15 to 1 wt % of (c) an aromatic polycarbonate resin and/or a styrene-maleic anhydride copolymer, (B) glass fiber having attached thereto a sizing agent containing an aminosilane coupling agent and a novolac epoxy resin and (C) an epoxy compound. However, further improvement is required for such a polyester resin composition with regard to the heat resistance and low-warp behavior.

PTL 2 describes a thermoplastic polyester resin composition provided by blending 10 to 80 wt % of (A) a thermoplastic polyester resin; 1 to 15 wt % of (B) an epoxy group-containing vinyl copolymer; 1 to 15 wt % of (C) an ABS resin; 1 to 20 wt % of (D) two or more resins from (d-1) maleic anhydride-modified polystyrene resins, (d-2) rubber-modified polystyrene resins, and (d-3) polycarbonate resins; 0 to 50 wt % of (E) glass fiber; 3 to 20 wt % of (F) a halogenated epoxy brominated flame retardant; and 1 to 10 wt % of (G) an antimony compound. This composition is reported to exhibit, in addition to flame retardancy, high impact properties, high strength, and a low-warp behavior, an excellent heat cycling performance, an excellent dimensional stability after annealing treatment, and an excellent heat-resistant stiffness. However, very high levels of heat resistance and low-warp behavior have come to be required quite recently, and even the thermoplastic polyester resin composition described in PTL 2 is still inadequate with regard to heat resistance and low-warp behavior.

CITATION LIST

Patent Literature

[PTL 1] JP 2006-16559 A
[PTL 2] JP 2007-314619 A

SUMMARY OF INVENTION

Technical Problem

The object of (problem for) the present invention is to provide a highly heat-resistant thermoplastic resin composition that exhibits an excellent low-warp behavior and appearance and an excellent mechanical strength, chemical resistance, and flame retardancy, and to provide a molded article composed of this thermoplastic resin composition.

Solution to Problem

As a result of intensive investigations in order to solve the above problem, the present inventor has discovered that, when a low molecular weight polyalkylene terephthalate resin is combined with a high molecular weight polystyrene resin or rubber-reinforced polystyrene resin (HIPS), the use of a minor amount of the polyalkylene terephthalate resin with a major amount of the polystyrene resin or HIPS provides a resin composition that, notwithstanding the low molecular weight polyalkylene terephthalate resin being present in a minor amount, exhibits a high heat resistance, which is a characteristic of polyalkylene terephthalates, and has an excellent low-warp behavior. The present invention has been made based on this discovery.

The present invention relates to the thermoplastic resin composition and molded article described in the following.

[1] A thermoplastic resin composition containing, based on 100 mass parts for a total of following (A) and (B), at least 20 mass parts but less than 50 mass parts of (A) a polyalkylene terephthalate resin, and more than 50 mass parts and not more than 80 mass parts of (B) a polystyrene resin or a rubber-reinforced polystyrene resin, wherein an intrinsic viscosity ($IV_A$) of the polyalkylene terephthalate resin (A) is 0.3 to 0.8 dl/g and a melt viscosity ($\eta_B$) of the polystyrene resin or rubber-reinforced polystyrene resin (B) at 250° C. and 912 sec$^{-1}$ is at least 80 Pa·sec.

[2] The thermoplastic resin composition according to [1], further containing (C) a compatibilizer at 1 to 25 mass parts per 100 mass parts of the total of (A) and (B).

[3] The thermoplastic resin composition according to [1] or [2], wherein the compatibilizer (C) is a polycarbonate resin and/or a styrene-maleic acid copolymer.

[4] The thermoplastic resin composition according to any of [1] to [3], further containing (D) glass fiber at 5 to 150 mass parts per 100 mass parts of the total of (A) and (B).

[5] The thermoplastic resin composition according to [4], wherein the glass fiber (D) is present in a state of being surrounded by a polyalkylene terephthalate resin (A) phase.

[6] The thermoplastic resin composition according to [4] or [5], wherein an aspect ratio of a long direction cross section of the glass fiber (D) is 2 to 6.

[7] The thermoplastic resin composition according to any of [4] to [6], wherein an area of the long direction cross section of the glass fiber (D) is greater than 180 μm² but not greater than 300 μm².

[8] The thermoplastic resin composition according to any of [1] to [7], wherein relation (I) below is satisfied by the intrinsic viscosity ($IV_A$) of the polyalkylene terephthalate resin (A) and a quantity ratio of (A) to a content of the total of (A) and (B), and the melt viscosity ($\eta_B$) of the polystyrene resin or rubber-reinforced polystyrene resin (B) and a quantity ratio of (B) to a content of the total of (A) and (B).

[quantity ratio of $(A)/IV_A$]≥[quantity ratio of $(B)/(\eta_B/80)$]   (I)

[9] The thermoplastic resin composition according to any of [1] to [8], further containing, per 100 mass parts of the total of (A) and (B), 10 to 50 mass parts of (E) a brominated flame retardant and 0.1 to 30 mass parts of (F) an antimony compound.

[10] The thermoplastic resin composition according to [9], wherein the brominated flame retardant (E) is at least one brominated flame retardant selected from brominated phthalimides, brominated polyacrylates, brominated polycarbonates, brominated epoxies, and brominated polystyrenes.

[11] The thermoplastic resin composition according to [9] or [10], further containing, per 100 mass parts of the total of (A) and (B), 0.1 to 20 mass parts of an inorganic filler selected from talc, mica, wollastonite, kaolin, and calcium carbonate.

[12] The thermoplastic resin composition according to any of [1] to [3], further containing (G) carbon fiber at 5 to 100 mass parts per 100 mass parts of the total of (A) and (B).

[13] The thermoplastic resin composition according to [12], wherein an average fiber diameter of the carbon fiber (G) is not greater than 10 μm.

[14] The thermoplastic resin composition according to [12] or [13], which has a specific gravity in a range of 1.0 to 1.33.

[15] The thermoplastic resin composition according to [3], wherein a mass-average molecular weight ($Mw_A$) of the polyalkylene terephthalate resin (A) is 20,000 to 65,000, a mass-average molecular weight ($Mw_B$) of the polystyrene resin or rubber-reinforced polystyrene resin (B) is 150,000 to 500,000, and a mass ratio (C1)/A between (C1) a polycarbonate resin and/or styrene-maleic acid copolymer and the polyalkylene terephthalate resin (A) is 0.1 to 0.7.

[16] The thermoplastic resin composition according to [15], wherein relation (II) below is satisfied by the mass-average molecular weight ($Mw_A$) of the polyalkylene terephthalate resin (A) and a quantity ratio of (A) to the content of the total of (A) and (B), and the mass-average molecular weight ($Mw_B$) of the polystyrene resin or rubber-reinforced polystyrene resin (B) and a quantity ratio of (B) to the content of the total of (A) and (B).

0.1≤[quantity ratio of $(B)/Mw_B$]/[quantity ratio of $(A)/Mw_A$]≤0.7   (II)

[17] The thermoplastic resin composition according to any of [1] to [16], wherein the polyalkylene terephthalate resin (A) is a polybutylene terephthalate resin and/or a polyethylene terephthalate resin.

[18] A molded article containing the thermoplastic resin composition according to any of [1] to [17].

[19] The molded article according to [18], which is a housing for a device part mounted in an automobile.

[20] The molded article according to [18], which is a connector part for automotive electrical equipment.

Advantageous Effects of Invention

Despite the thermoplastic resin composition according to the present invention being a system rich in the polystyrene resin or rubber-reinforced polystyrene resin and having less of the polyalkylene terephthalate resin, surprisingly the low molecular weight polyalkylene terephthalate resin forms the sea (matrix) in a sea-island structure or the sea in a co-continuous structure, while the high-melt-viscosity polystyrene resin or rubber-reinforced polystyrene resin forms the islands. As a consequence, a high heat resistance and an excellent low-warp behavior and excellent appearance are obtained, and an excellent chemical resistance and mechanical strength deriving from the polyalkylene terephthalate resin are also obtained.

Moreover, the strength and appearance can be improved still further by the additional incorporation of a compatibilizer.

Through the additional incorporation of glass fiber and particularly glass fiber having an aspect ratio for the long direction cross section of 2 to 6, a resin phase of the polyalkylene terephthalate resin readily forms the matrix (sea) by becoming continuous via the glass fiber. As a result, the heat resistance is specifically further improved, an excellent low-warp behavior and appearance are exhibited, and the mechanical strength and chemical resistance are also excellent.

Through the additional incorporation of a brominated flame retardant, a high heat resistance, which is a characteristic of polyalkylene terephthalate resins, is exhibited notwithstanding the minor amount of the low molecular weight polyalkylene terephthalate resin, and an excellent low-warp behavior and a high flame retardancy are exhibited.

Through the additional incorporation of carbon fiber, a resin composition can be provided that exhibits a high heat resistance, which is a characteristic of polyalkylene terephthalate resins, notwithstanding the minor amount of the low molecular weight polyalkylene terephthalate resin, and that exhibits an excellent low-warp behavior.

Accordingly, the thermoplastic resin composition according to the present invention can be suitably used for, for example, parts for various electrical and electronic devices and automotive interior and exterior parts.

BRIEF DESCRIPTION OF DRAWINGS

FIG. 1 is an SEM image taken with a scanning electron microscope of the thermoplastic resin composition obtained in Example III-1.

DESCRIPTION OF EMBODIMENTS

The thermoplastic resin composition according to the present invention contains, based on 100 mass parts for the total of (A) and (B), at least 20 mass parts but less than 50 mass parts of (A) a polyalkylene terephthalate resin and more than 50 mass parts and not more 80 mass parts of (B) a polystyrene resin or a rubber-reinforced polystyrene resin, wherein the intrinsic viscosity ($IV_A$) of the polyalkylene terephthalate resin (A) is 0.3 to 0.8 dl/g and the melt viscosity ($\eta_B$) of the polystyrene resin or rubber-reinforced polystyrene resin (B) at 250° C. and 912 sec$^{-1}$ is at least 80 Pa·sec.

Embodiments of the present invention are described in detail in the following. The description given herebelow is provided based on embodiments and specific examples;

however, this should not be taken to mean that the present invention is limited to such embodiments and specific examples.

In this Description, "to" in the specification of a numerical value range is used in the sense of including the numerical values before and after the "to" as the lower limit and upper limit.

[Polyalkylene Terephthalate Resin (A)]

The thermoplastic resin composition according to the present invention contains a polyalkylene terephthalate resin (A) that has an intrinsic viscosity ($IV_A$) of 0.3 to 0.8 dl/g.

By using a polyalkylene terephthalate resin having an intrinsic viscosity ($IV_A$) in the range from 0.3 to 0.8 dl/g, the characteristics of the polyalkylene terephthalate resin are strongly expressed and a resin composition is then provided that exhibits a high heat resistance and an excellent low-warp behavior and also an excellent mechanical strength and chemical resistance.

When the intrinsic viscosity ($IV_A$) is lower than 0.3 dl/g, the heat resistance of the polyalkylene terephthalate is not expressed and in addition the expression of a low mechanical strength is also facilitated. At above 0.8 dl/g, the formation of the sea-island structure indicated above is impeded, the polystyrene resin or rubber-reinforced polystyrene resin readily assumes the sea phase, and the flowability of the resin composition worsens and the moldability readily deteriorates. The intrinsic viscosity ($IV_A$) is preferably at least 0.4 dl/g, more preferably at least 0.5 dl/g, and still more preferably at least 0.55 dl/g, and preferably is not more than 0.75 dl/g.

In the present invention, the intrinsic viscosity of the polyalkylene terephthalate resin (A) is the value measured at 30° C. in a mixed solvent of 1:1 (mass ratio) tetrachloroethane and phenol.

The polyalkylene terephthalate resin (A) is a polyester obtained, for example, by the polycondensation of a dihydroxy compound and terephthalic acid serving as a dicarboxylic acid compound, and may be a homopolyester or a copolyester.

The compound terephthalic acid or an ester-forming derivative thereof is preferably used as the dicarboxylic acid compound constituting the polyalkylene terephthalate resin (A).

An aromatic dicarboxylic acid other than terephthalic acid may also be used in combination therewith, for example, isophthalic acid, ortho-phthalic acid, 1,5-naphthalenedicarboxylic acid, 2,5-naphthalenedicarboxylic acid, 2,6-naphthalenedicarboxylic acid, biphenyl-2,2'-dicarboxylic acid, biphenyl-3,3'-dicarboxylic acid, biphenyl-4,4'-dicarboxylic acid, diphenyl ether 4,4'¹-dicarboxylic acid, diphenylmethane-4,4'-dicarboxylic acid, diphenylsulfone-4,4'-dicarboxylic acid, diphenylisopropylidene-4,4'-dicarboxylic acid, 1,2-bis(phenoxy) ethane-4,4'-dicarboxylic acid, anthracene-2,5-dicarboxylic acid, anthracene-2,6-dicarboxylic acid, p-terphenylene-4,4'-dicarboxylic acid, and pyridine-2,5-dicarboxylic acid. These may be used in the polycondensation reaction as the free acid or as an ester-forming derivative, e.g., the dimethyl ester and so forth.

The use is preferred among the preceding in particular of isophthalic acid or an ester-forming derivative thereof.

A small amount of one or more aliphatic dicarboxylic acids, e.g., adipic acid, azelaic acid, dodecanedioic acid, sebacic acid, and so forth, and/or alicyclic dicarboxylic acids, e.g., 1,2-cyclohexanedicarboxylic acid, 1,3-cyclohexanedicarboxylic acid, 1,4-cyclohexanedicarboxylic acid, and so forth, may be blended and used together with the terephthalic acid and aforementioned aromatic dicarboxylic acid.

The dihydroxy compound constituting the polyalkylene terephthalate resin (A) can be exemplified by aliphatic diols such as ethylene glycol, propylene glycol, butanediol, hexylene glycol, neopentyl glycol, 2-methylpropane-1,3-diol, diethylene glycol, and triethylene glycol; by alicyclic diols such as cyclohexane-1,4-dimethanol; and by mixtures of the preceding. Butanediol and ethylene glycol are particularly preferred among the preceding.

One or more long-chain diols with a molecular weight of 400 to 6,000, i.e., polyethylene glycol, poly-1,3-propylene glycol, polytetramethylene glycol, and so forth, may be copolymerized.

Also usable are aromatic diols such as hydroquinone, resorcinol, naphthalenediol, dihydroxydiphenyl ether, and 2,2-bis(4-hydroxyphenyl)propane.

In addition to the difunctional monomers as indicated in the preceding, small amounts of the following may also be used: trifunctional and tetrafunctional monomers, e.g., trimellitic acid, trimesic acid, pyromellitic acid, pentaerythritol, trimethylolpropane, and so forth, in order to introduce branching structures, and monofunctional compounds, e.g., fatty acids, in order to adjust the molecular weight.

Polyalkylene terephthalate resin provided by the polycondensation of terephthalic acid and a diol is preferably mainly used, i.e., in an amount exceeding 50 mass % of the total resin, as the polyalkylene terephthalate resin (A), and this polycondensate is preferably at least 70 mass % and more preferably at least 80 mass % of the polyalkylene terephthalate resin (A). Aliphatic diol is preferred for the diol.

The amount of terminal carboxyl group in the polyalkylene terephthalate resin (A) may be determined by selection as appropriate, but generally is not more than 60 eq/ton and preferably is not more than 50 eq/ton and more preferably is not more than 30 eq/ton. At above 60 eq/ton, gas generation during melt molding of the resin composition is facilitated. There is no particular limitation on the lower limit for the amount of terminal carboxyl group, but this is generally 3 eq/ton, preferably 5 eq/ton, and more preferably generally 10 eq/ton.

The amount of terminal carboxyl group in the polyalkylene terephthalate resin (A) is the value measured by dissolving 0.5 g of the resin in 25 ml benzyl alcohol and performing titration using a 0.01 mol/l benzyl alcohol solution of sodium hydroxide. Any heretofore known method may be used as the method for adjusting the amount of terminal carboxyl group, e.g., methods based on adjustment of polymerization conditions such as the starting material charge ratios for polymerization, the polymerization temperature, the depressurization procedure, and so forth, and methods based on the reaction of a terminal blocking agent.

Preferred for the polyalkylene terephthalate resin (A) are polyalkylene terephthalate resins in which at least 95 mol % of the acid component is terephthalic acid and at least 95 mol % of the alcohol component is aliphatic diol, as represented by polybutylene terephthalate resins and polyethylene terephthalate resins. These are preferably approximately homopolyesters, i.e., at least 95 mol % of the overall resin is the terephthalic acid component and 1,4-butanediol or ethylene glycol component.

The polyalkylene terephthalate resin (A) preferably is a polybutylene terephthalate resin and/or a polyethylene terephthalate resin.

Among the preceding, the polyalkylene terephthalate resin (A) preferably contains polybutylene terephthalate resin as its main component, and preferably an amount in excess of 50 mass % of the polyalkylene terephthalate resin (A) is polybutylene terephthalate resin. It is also preferred here that polyethylene terephthalate resin be contained in the range of less than 50 mass %.

Polybutylene terephthalate resins can be produced by the batch or continuous melt polymerization of a diol component in which the main component is 1,4-butanediol and a dicarboxylic acid component in which the main component is terephthalic acid or an ester derivative of the dicarboxylic acid component. In addition, after a low molecular weight polybutylene terephthalate resin has been produced by melt polymerization, the degree of polymerization (or molecular weight) can be increased to a desired value by the execution of solid-phase polymerization under a nitrogen current or with pressure reduction.

A preferred method for producing the polybutylene terephthalate resin is continuous melt polycondensation of a dicarboxylic acid component in which terephthalic acid is the main component and a diol component in which 1,4-butanediol is the main component.

The catalyst used in the execution of the esterification reaction may be a heretofore known catalyst and can be exemplified by titanium compounds, tin compounds, magnesium compounds, and calcium compounds. Titanium compounds are particularly preferred thereamong. Specific examples of titanium compounds that may be used as an esterification catalyst are titanium alcoholates such as tetramethyl titanate, tetraisopropyl titanate, and tetrabutyl titanate, and titanium phenolates such as tetraphenyl titanate.

The polybutylene terephthalate resin may be a polybutylene terephthalate resin that has been modified by copolymerization (also referred to in the following as "modified polybutylene terephthalate resin"). Specific preferred copolymers here can be exemplified by polyester-ether resins provided by the copolymerization of polyalkylene glycols (particularly polytetramethylene glycol), dimer acid-copolymerized polybutylene terephthalate resins, and isophthalic acid-copolymerized polybutylene terephthalate resins.

When a polytetramethylene glycol-copolymerized polyester-ether resin is used as the modified polybutylene terephthalate resin, the proportion of the tetramethylene glycol component in the copolymer is preferably 3 to 40 mass %, more preferably 5 to 30 mass %, and still more preferably 10 to 25 mass %.

When a dimer acid-copolymerized polybutylene terephthalate resin is used as the modified polybutylene terephthalate resin, the proportion of the dimer acid component in the overall carboxylic acid component is preferably, as the carboxylic acid group, 0.5 to 30 mol %, more preferably 1 to 20 mol %, and still more preferably 3 to 15 mol %.

When an isophthalic acid-copolymerized polybutylene terephthalate resin is used as the modified polybutylene terephthalate resin, the proportion of the isophthalic acid component in the overall carboxylic acid component is preferably, as the carboxylic acid group, 1 to 30 mol %, more preferably 1 to 20 mol %, and still more preferably 3 to 15 mol %.

Among the modified polybutylene terephthalate resins, polytetramethylene glycol-copolymerized polyester-ether resins and isophthalic acid-copolymerized polybutylene terephthalate resins are preferred.

The amount of terminal carboxyl group in the polybutylene terephthalate resin may be determined by selection as appropriate, but generally is not more than 60 eq/ton and preferably is not more than 50 eq/ton, more preferably is not more than 40 eq/ton, and still more preferably is not more than 30 eq/ton. At above 60 eq/ton, gas generation during melt molding of the resin composition is facilitated. There is no particular limitation on the lower limit for the amount of terminal carboxyl group, but this is generally 10 eq/ton considering the productivity in production of the polybutylene terephthalate resin.

The amount of terminal carboxyl group in the polybutylene terephthalate resin is the value measured by dissolving 0.5 g of the polyalkylene terephthalate resin in 25 mL benzyl alcohol and performing titration using a 0.01 mol/l benzyl alcohol solution of sodium hydroxide. Any heretofore known method may be used as the method for adjusting the amount of terminal carboxyl group, e.g., methods based on adjustment of polymerization conditions such as the starting material charge ratios for polymerization, the polymerization temperature, the depressurization procedure, and so forth, and methods based on the reaction of a terminal blocking agent.

Another preferred polyalkylene terephthalate resin (A) contains polybutylene terephthalate homopolymer and the aforementioned modified polybutylene terephthalate resin. The incorporation of a prescribed amount of the modified polybutylene terephthalate resin facilitates improvement in the weld strength and alkali resistance and is thus preferred.

With regard to the content when both polybutylene terephthalate homopolymer and a modified polybutylene terephthalate resin are incorporated, the modified polybutylene terephthalate resin, based on 100 mass % for the total of the polybutylene terephthalate homopolymer and modified polybutylene terephthalate resin, is preferably 5 to 50 mass %, more preferably 10 to 40 mass %, and still more preferably 15 to 30 mass %.

The polyalkylene terephthalate resin (A) also preferably contains polybutylene terephthalate resin and polyethylene terephthalate resin. The incorporation of a prescribed amount of polyethylene terephthalate resin facilitates improvements in the low-warp behavior, external appearance, and weld strength and is thus preferred.

With regard to the content when both polybutylene terephthalate resin and polyethylene terephthalate resin are incorporated, the polyethylene terephthalate resin, based on 100 mass % for the total of the polybutylene terephthalate resin and polyethylene terephthalate resin, is preferably at least 5 mass % but less than 50 mass %, more preferably 10 to 45 mass %, and still more preferably 15 to 40 mass %.

The polyethylene terephthalate resin is a resin in which the main constituent unit, relative to the total constituent units, is the oxyethyleneoxyterephthaloyl unit from terephthalic acid and ethylene glycol, and it may contain constituent repeat units other than the oxyethyleneoxyterephthaloyl unit. The polyethylene terephthalate resin is produced using terephthalic acid or a lower alkyl ester thereof and ethylene glycol as the main starting materials, but an additional acid component and/or an additional glycol component may also be used as a starting material.

The acid component other than terephthalic acid can be exemplified by dicarboxylic acids, e.g., phthalic acid, isophthalic acid, naphthalenedicarboxylic acid, 4,4'-diphenylsulfonedicarboxylic acid, 4,4'-biphenyldicarboxylic acid, 1,4-cyclohexanedicarboxylic acid, 1,3-phenylenedioxydiacetic acid and its structural isomers, malonic acid, succinic acid, and adipic acid, and their derivatives, and by oxy acids, e.g., p-hydroxybenzoic acid and glycolic acid, and their derivatives.

The diol component other than ethylene glycol can be exemplified by aliphatic glycols, e.g., 1,2-propanediol, 1,3-propanediol, 1,4-butanediol, pentamethylene glycol, hexamethylene glycol, and neopentyl glycol; alicyclic glycols such as cyclohexanedimethanol; and aromatic dihydroxy compound derivatives such as bisphenol A and bisphenol S.

The polyethylene terephthalate resin may also be provided by the copolymerization of not more than 1.0 mol %, preferably not more than 0.5 mol %, and more preferably not more than 0.3 mol % of a branching component, for example, a trifunctional ester-forming acid such as tricarballylic acid, trimesic acid, or trimellitic acid, or a tetrafunctional ester-forming acid such as pyromellitic acid, or a trifunctional or tetrafunctional ester-forming alcohol such as glycerol, trimethylolpropane, and pentaerythritol.

When the polyalkylene terephthalate resin (A) contains both polybutylene terephthalate resin and polyethylene terephthalate resin, the inherent viscosity ($IV_A$) of the polyalkylene terephthalate resin (A) is to be 0.3 to 0.8 dl/g; however, a combination may also be formulated in which either or each of the polybutylene terephthalate resin and polyethylene terephthalate resin is outside the 0.3 to 0.8 dl/g range while the intrinsic viscosity ($IV_A$) for the polyalkylene terephthalate resin (A) can be brought into the indicated range.

The concentration of terminal carboxyl group in the polyethylene terephthalate resin is preferably 3 to 50 eq/ton, more preferably 5 to 40 eq/ton, and still more preferably 10 to 30 eq/ton.

The concentration of terminal carboxyl group in the polyethylene terephthalate resin is the value determined by dissolving 0.5 g of the polyethylene terephthalate resin in 25 mL benzyl alcohol and performing titration using a 0.01 mol/l benzyl alcohol solution of sodium hydroxide.

Any heretofore known method may be used as the method for adjusting the amount of terminal carboxyl group, e.g., methods based on adjustment of polymerization conditions such as the starting material charge ratios for polymerization, the polymerization temperature, the depressurization procedure, and so forth, and methods based on the reaction of a terminal blocking agent.

[Polystyrene Resin or Rubber-Reinforced Polystyrene Resin (B)]

The thermoplastic resin composition according to the present invention contains a polystyrene resin and/or rubber-reinforced polystyrene resin (B).

The polystyrene resin may be a homopolymer of styrene or may be provided by the copolymerization of another aromatic vinyl monomer, for example, α-methylstyrene, para-methylstyrene, vinyltoluene, vinylxylene, and so forth, for example, in a range of not more than 50 mass %.

The rubber-reinforced polystyrene resin is preferably provided by the copolymerization or blending of a butadiene rubber component, with the amount of the butadiene rubber component being generally at least 1 mass % but less than 50 mass % and preferably 3 to 40 mass %, more preferably 5 to 30 mass %, and still more preferably 5 to 20 mass %. The rubber-reinforced polystyrene resin is particularly preferably a high-impact polystyrene (HIPS).

A polystyrene resin or rubber-reinforced polystyrene resin (B) having a melt viscosity ($\eta_B$) at 250° C. and 912 sec$^{-1}$ of at least 80 Pa·sec is used in the present invention. By blending a polystyrene resin or rubber-reinforced polystyrene resin having such a melt viscosity ($\eta_B$)—using amounts, based on 100 mass parts for the total of (A) and (B), of at least 20 mass parts but less than 50 mass parts of the polyalkylene terephthalate resin (A) and more than 50 mass parts and not more than 80 mass parts of the polystyrene resin or rubber-reinforced polystyrene resin (B)—the polyalkylene terephthalate resin (A) becomes dominant with regard to properties and as a result a high heat resistance and a low-warp behavior can be achieved. The heat resistance is inadequate when the melt viscosity ($\eta_B$) is less than 80 Pa·sec.

The melt viscosity ($\eta_B$) is preferably at least 90 Pa·sec, more preferably at least 100 Pa·sec, still more preferably at least 110 Pa·sec, even more preferably at least 120 Pa·sec, and particularly preferably at least 130 Pa·sec. Its upper limit is preferably not more than 500 Pa·sec, more preferably not more than 300 Pa·sec, still more preferably not more than 200 Pa·sec, even more preferably not more than 180 Pa·sec, and particularly preferably not more than 160 Pa·sec.

The melt viscosity can be measured based on ISO 11443 using a capillary rheometer or a split-die rheometer. Specifically, the melt viscosity can be calculated from the stress when a piston is pushed at a piston speed of 75 mm/min into an oven body with an inner diameter of 9.5 mm and heated to 250° C., using an orifice having a capillary diameter of 1 mm and a capillary length of 30 mm.

As indicated above, the content of the polyalkylene terephthalate resin (A), based on 100 mass parts for the total of (A) and (B), is at least 20 mass parts but less than 50 mass parts, while the polystyrene resin or rubber-reinforced polystyrene resin (B) is more than 50 mass parts and not more than 80 mass parts. Preferably (A) is at least 25 mass parts but less than 50 mass parts, more preferably at least 30 mass parts but less than 50 mass parts, and still more preferably 30 to 48 mass parts, while (B) is preferably more than 50 mass parts and not more than 75 mass parts, more preferably more than 50 mass parts and not more than 70 mass parts, and still more preferably 52 to 70 mass parts.

The following relation (I) is preferably satisfied in the present invention by the intrinsic viscosity ($IV_A$) of the polyalkylene terephthalate resin (A) and the quantity ratio of (A) to the content of the total of (A) and (B), and the melt viscosity ($\eta_B$) of the polystyrene resin or rubber-reinforced polystyrene resin (B) and the quantity ratio of (B) to the content of the total of (A) and (B).

$$[\text{quantity ratio of } (A)/IV_A] \geq [\text{quantity ratio of } (B)/(\eta_B/80)] \quad (I)$$

The significance of the rule in formula (I) is described in the following.

As noted above, in the present invention the polyalkylene terephthalate resin (A), while being present in a minor amount, forms the sea in a co-continuous structure or preferably in a sea-island structure, and the left side in formula (I) represents the ease with which the polyalkylene terephthalate resin (A) assumes the sea phase. The sea phase is more readily assumed as the quantity ratio of (A) increases; in addition, the assumption of a sea phase is facilitated as the flowability of (A) is better and the flowability is better at smaller values of $IV_A$, and $IV_A$ is therefore multiplied as the reciprocal and the left side of formula (I) then represents the ease with which component (A) becomes the sea.

The right side in formula (I), on the other hand, represents the ease with which the polystyrene resin or rubber-reinforced polystyrene resin (B) assumes the sea phase. The sea phase is naturally more readily assumed as the quantity ratio of (B) increases; in addition, the assumption of a sea phase is facilitated as the flowability of (B) is better and the flowability is better at smaller values of the melt viscosity ($\eta_B$), and $\eta_B$ is therefore multiplied as the reciprocal and the ease with which component (B) becomes the sea is then represented.

The assumption of the sea phase (matrix) by the polyalkylene terephthalate resin (A) is facilitated by having the left side Z right side as in formula (I). The 80 on the right side is a coefficient for adjusting the level of the numerical values of the two sides. In addition, the appearance of the high heat resistance performance of the resin composition that satisfies the relation (I) for the quantity ratios materializes only when the resin partnered with the polyalkylene terephthalate resin (A) is the polystyrene resin or rubber-reinforced polystyrene resin (B), and this is specific since, for example, an acrylonitrile-styrene copolymer having approximately the same composition is unable to exhibit the excellent characteristics even when it satisfies formula (I).

The assumption of the sea phase (matrix) by the polyalkylene terephthalate resin (A) is facilitated by having formula (I) be satisfied, and the resulting thermoplastic resin composition can exhibit a higher heat resistance and a low-warp behavior to a greater degree and in addition can also retain the chemical resistance exhibited by polyalkylene terephthalates.

The mass-average molecular weight ($Mw_A$) of the polyalkylene terephthalate resin (A) is preferably in the range of 20,000 to 65,000; this provides a resin composition that strongly expresses the characteristics of polyalkylene terephthalate resins and exhibits a high heat resistance and an excellent low-warp behavior as well as an excellent mechanical strength and chemical resistance.

The use of a mass-average molecular weight ($Mw_A$) of less than 20,000 facilitates the occurrence of a low mechanical strength. At above 65,000, the formation of the sea-island structure indicated above is impeded, the polystyrene resin or rubber-reinforced polystyrene resin readily assumes the sea phase, and the flowability of the resin composition worsens and the moldability readily deteriorates. The mass-average molecular weight ($Mw_A$) is preferably at least 25,000 and more preferably at least 30,000 and is preferably not more than 60,000.

In the present invention, the mass-average molecular weight ($Mw_A$) of the polyalkylene terephthalate resin (A) is the mass-average molecular weight as polystyrene measured by gel permeation chromatography (GPC).

The mass-average molecular weight here is calculated as follows. 0.1 mass % chloroform solution of the polyester is prepared by dissolving 20 mg of polyalkylene terephthalate resin pellets in 13.5 cm³ chloroform. This is filtered across a polytetrafluoroethylene filter having a pore diameter of 0.45 pnm, and 100 μL is then introduced into an "HLC-8220GPC" high-performance GPC from Tosoh Corporation. The measurement is carried out using a "PL10μ Mixed B (30 cm×2)" column, a column temperature of 40° C., a mobile phase of chloroform, a flow rate of 1.0 mL/minute, and a differential refractive index detector. The average molecular weight is calculated as polystyrene using monodisperse polystyrene as the calibration sample.

The mass-average molecular weight ($Mw_A$) of the polyalkylene terephthalate resin (A) can be adjusted mainly through, for example, the reaction time during polycondensation. Shorter polycondensation times provide lower mass-average molecular weights ($Mw_A$). However, under conditions in which a large amount of polymerization catalyst is present, the molecular weight undergoes a sharp increase from the beginning of the polymerization and it becomes difficult to obtain the mass-average molecular weight suitable for the present invention in a stable manner; because of this, the amount of catalyst and so forth is preferably adjusted in conformity to the desired mass-average molecular weight.

The mass-average molecular weight ($Mw_B$) of the polystyrene resin or rubber-reinforced polystyrene resin (B) is preferably 150,000 to 500,000. By blending a polystyrene resin or rubber-reinforced polystyrene resin having such a mass-average molecular weight ($Mw_B$)—using amounts, based on 100 mass parts for the total of (A) and (B), of at least 20 mass parts but less than 50 mass parts of the polyalkylene terephthalate resin (A) and more than 50 mass parts and not more 80 mass parts of the polystyrene resin or rubber-reinforced polystyrene resin (B)—the polyalkylene terephthalate resin (A) becomes dominant with regard to properties and as a result a high heat resistance and a low-warp behavior can be achieved. The occurrence of an unsatisfactory heat resistance is facilitated when the mass-average molecular weight ($Mw_B$) is less than 150,000.

The mass-average molecular weight ($Mw_B$) is more preferably at least 155,000, even more preferably at least 160,000, and particularly preferably at least 175,000, and is more preferably not more than 450,000, even more preferably not more than 430,000, and particularly preferably not more than 400,000.

The mass-average molecular weight ($Mw_B$) of the polystyrene resin or rubber-reinforced polystyrene resin (B) is the mass-average molecular weight as polystyrene measured using gel permeation chromatography (GPC). The measurement can be specifically carried out using the following conditions.

Fractionation column: 2×TSK gel Super HZM-H (inner diameter of 4.6 mm), connected in series, from the Tosoh Corporation Guard column: TSK guard column Super HZ-H, from the Tosoh Corporation Measurement solvent: tetrahydrofuran (THF)

Sample concentration: 5 mg of the measurement sample is dissolved in 10 mL of solvent and filtration is carried out across a 0.45 μm filter.

Injection amount: 10 μL

Measurement temperature: 40° C.

Flow rate: 0.35 mL/minute

Detector: ultraviolet absorbance detector (wavelength=254 nm)

The following relation (II) is satisfied in the present invention by the mass-average molecular weight ($Mw_A$) of the polyalkylene terephthalate resin (A) and the quantity ratio of (A) to the content of the total of (A) and (B), and the mass-average molecular weight ($Mw_B$) of the polystyrene resin or rubber-reinforced polystyrene resin (B) and the quantity ratio of (B) to the content of the total of (A) and (B).

$$0.1 \leq [\text{quantity ratio of } (B)/Mw_B]/[\text{quantity ratio of } (A)/Mw_A] \leq 0.7 \quad \text{(II)}$$

The significance of the rule in formula (II) is described in the following.

As noted above, in the present invention the polyalkylene terephthalate resin (A), while being present in a minor amount, forms the sea in a co-continuous structure or preferably in a sea-island structure, and the [quantity ratio of (A)/$Mw_A$] in formula (II) represents the ease with which the polyalkylene terephthalate resin (A) assumes the sea phase. The sea phase is more readily assumed as the quantity ratio of (A) increases; in addition, the assumption of a sea phase is facilitated as the flowability of (A) is better and the flowability is better at smaller values of $Mw_A$.

The [quantity ratio of (B)/$Mw_B$] in formula (II), on the other hand, represents the ease with which the polystyrene resin or rubber-reinforced polystyrene resin (B) assumes the sea phase. The sea phase is naturally more readily assumed as the quantity ratio of (B) increases; in addition, the assumption of a sea phase is facilitated as the flowability of (B) is better and the flowability is better at smaller values of $Mw_B$.

Formula (II) is the ratio between the ease with which component (B) becomes the sea phase and the ease with which component (A) becomes the sea phase, and when the value of formula (II) is in the range preferably of 0.1 to 0.7, even at a small quantity ratio of (A) the characteristics of the polyalkylene terephthalate resin (A) predominate and a high heat resistance can be obtained.

The appearance of the high heat resistance performance of the resin composition that satisfies the relation (II) for the quantity ratios materializes only when the resin partnered with the polyalkylene terephthalate resin (A) is the polystyrene resin or rubber-reinforced polystyrene resin (B), and this is specific since, for example, an acrylonitrile-styrene copolymer having approximately the same composition is unable to exhibit the excellent characteristics even when it satisfies formula (II).

The assumption of the sea phase (matrix) by the polyalkylene terephthalate resin (A) is facilitated by having formula (II) be satisfied, and the resulting thermoplastic resin composition can exhibit a higher heat resistance and a low-warp behavior to a greater degree and in addition can also retain the chemical resistance exhibited by polyalkylene terephthalates.

The value of formula (II) is more preferably at least 0.15 and even more preferably at least 0.18 and more preferably not more than 0.6, even more preferably not more than 0.55, and particularly preferably not more than 0.5.

[Compatibilizer (C)]

The resin composition according to the present invention preferably additionally contains a compatibilizer (C). The incorporation of the compatibilizer (C) functions to promote compatibilization between the polybutylene terephthalate resin (A) and the polystyrene resin or rubber-reinforced polystyrene resin (B). As a consequence, a small dispersed particle diameter is obtained for the polystyrene resin or rubber-reinforced polystyrene resin (B) that is dispersed in the polybutylene terephthalate resin (A) phase and the interfacial strength is also raised, thereby facilitating the occurrence of an excellent mechanical strength and an excellent appearance.

The compatibilizer (C) should have the ability to effect compatibilization between the polybutylene terephthalate resin (A) and the polystyrene resin or rubber-reinforced polystyrene resin (B), but is not otherwise particularly limited, and polymeric compound compatibilizers are preferred from a heat resistance standpoint.

Polycarbonate resins and styrene-maleic acid copolymers are particularly preferred for the compatibilizer (C). Through the incorporation of a polycarbonate resin or styrene-maleic acid copolymer, the compatibility between the polyalkylene terephthalate phase and the polystyrene resin or rubber-reinforced polystyrene resin is strengthened and a high strength can be expressed.

The polycarbonate resin is a possibly branched thermoplastic polymer or copolymer, obtained by reacting a dihydroxy compound, or a dihydroxy compound and a small amount of a polyhydroxy compound, with phosgene or a carbonate diester. There are no particular limitations on the method for producing the polycarbonate resin, and polycarbonate resin produced by a heretofore known phosgene method (interfacial polymerization method) or melt method (transesterification method) can be used.

The starting dihydroxy compound substantially does not contain the bromine atom and preferably is an aromatic dihydroxy compound. Specific examples are 2,2-bis(4-hydroxyphenyl)propane (i.e., bisphenol A), tetramethylbisphenol A, bis(4-hydroxyphenyl)-p-diisopropylbenzene, hydroquinone, resorcinol, and 4,4-dihydroxydiphenyl, with bisphenol A being preferred. Also usable are compounds provided by bonding one or more tetraalkylphosphonium sulfonates in the aforementioned aromatic dihydroxy compounds.

Preferred among the preceding for the polycarbonate resin are aromatic polycarbonate resins derived from 2,2-bis(4-hydroxyphenyl)propane and aromatic polycarbonate copolymers derived from 2,2-bis(4-hydroxyphenyl)propane and another aromatic dihydroxy compound. This may also be a copolymer in which the main component is aromatic polycarbonate resin, e.g., a copolymer with an oligomer or polymer having a siloxane structure. A mixture of two or more of these polycarbonate resins may be used.

A monofunctional aromatic hydroxy compound may be used to adjust the molecular weight of the polycarbonate resin, and this monofunctional aromatic hydroxy compound can be exemplified by m- and p-methylphenols, m- and p-propylphenols, p-tert-butylphenol, and p-long chain-alkyl-substituted phenols.

The viscosity-average molecular weight (Mv) of the polycarbonate resin is preferably at least 15,000, more preferably at least 20,000, even more preferably at least 23,000, particularly preferably at least 25,000, and in particular most preferably exceeds 28,000. When a polycarbonate resin having a viscosity-average molecular weight below 15,000 is used, the resulting resin composition readily assumes a low mechanical strength, e.g., impact resistance and so forth. In addition, My is preferably not more than 60,000, more preferably not more than 40,000, and even more preferably not more than 35,000. An Mv higher than 60,000 can result in a worsening of the flowability of the resin composition and a deterioration in the moldability.

In the present invention, the viscosity-average molecular weight (Mv) of the polycarbonate resin refers to the value calculated using Schnell's viscosity equation, given below, from the intrinsic viscosity ([η]) determined by measurement using a Ubbelohde viscometer of the viscosity at 25° C. of a methylene chloride solution of the polycarbonate resin.

$$[\eta]=1.23\times10^{-4}\,Mv^{0.83}$$

There are no particular limitations on the method for producing the polycarbonate resin, and polycarbonate resin produced by a phosgene method (interfacial polymerization method) or a melt method (transesterification method) may also be used. Polycarbonate resin on which a post-treatment for adjusting the amount of terminal OH group has been executed is also preferred for polycarbonate resin produced by a melt method.

The styrene-maleic acid copolymer is preferably a styrene-maleic anhydride copolymer (SMA resin). This is a copolymer of styrene monomer and maleic acid monomer and can be produced by a heretofore known polymerization method, e.g., radical polymerization.

The molecular weight and so forth of the styrene-maleic acid copolymer is not particularly limited, but the mass-average molecular weight is preferably at least 10,000 and not more than 500,000, more preferably at least 40,000 and not more than 400,000, and even more preferably at least 80,000 and not more than 350,000. This mass-average molecular weight is the mass-average molecular weight as polystyrene measured by gel permeation chromatography (GPC) using tetrahydrofuran as solvent.

An additional monomer component may be copolymerized in the styrene-maleic acid copolymer within a range in which the characteristics of the present invention are not impaired. Specific examples in this regard are aromatic vinyl monomers such as α-methylstyrene; vinyl cyanide monomers such as acrylonitrile; alkyl unsaturated carboxylate monomers such as methyl methacrylate and methyl acrylate; and maleimide monomers such as N-methylmaleimide, N-ethylmaleimide, N-cyclohexylmaleimide, and N-phenylmaleimide. A single one of these or two or more may be used.

Based on 100 mass parts for the total of the polyalkylene terephthalate resin (A) and the polystyrene resin or rubber-reinforced polystyrene resin (B), the content of the compatibilizer (C) is preferably 1 to 25 mass parts, more preferably 3 to 20 mass parts, and even more preferably 3 to 18 mass parts, for the two separately or in total.

When the compatibilizer (C) is a polycarbonate resin and/or a styrene-maleic acid copolymer, its content, based on 100 mass parts for the total of the polyalkylene terephthalate resin (A) and the polystyrene resin or rubber-reinforced polystyrene resin (B), is preferably 1 to 25 mass parts, more preferably 3 to 20 mass parts, and even more preferably 3 to 18 mass parts, for the two separately or in total.

The mass ratio (C1)/(A) between the polycarbonate resin and/or styrene-maleic acid copolymer (C1) and the polyalkylene terephthalate resin (A) is preferably 0.1 to 0.7. Having (C1)/(A) be in this range can facilitate the occurrence of an excellent strength while retaining a high heat resistance. (C1)/(A) is more preferably 0.1 to 0.5 and is still more preferably 0.1 to 0.4.

[Glass Fiber (D)]

The thermoplastic resin composition according to the present invention preferably contains glass fiber (D).

Any known glass fiber conventionally used in thermoplastic polyester resins may be used as this glass fiber, regardless of the form of the glass fiber at the point of blending, e.g., A glass, E glass, alkali-resistant glass compositions containing a zirconia component, chopped strand, roving glass, thermoplastic resin/glass fiber masterbatches, and so forth. Among these, the glass fiber used in the present invention is preferably an alkali-free glass (E glass) with the goal of improving the heat stability of the thermoplastic resin composition according to the present invention.

The glass fiber (D) is particularly preferably glass fiber for which the aspect ratio of the long direction cross section is 2 to 6.

The aspect ratio of the long direction cross section is the long diameter/short diameter ratio obtained by postulating the rectangle of minimum area that circumscribes the cross section perpendicular to the long direction of the glass fiber and assigning the long diameter to the length of the long side of this rectangle and assigning the short diameter to the length of the short side. The present inventor hypothesizes that through the incorporation in the present invention of glass fiber having an aspect ratio of 2 to 6, a bridging function is established that connects between the polybutylene terephthalate resin (A) phase in which the glass fiber is oriented and the formation of the matrix (sea) by the polybutylene terephthalate resin is facilitated, and that as a consequence the heat resistance is specifically improved and an excellent low-warp behavior and appearance are established.

In addition, it is thought that when this glass fiber is present surrounded by the polyalkylene terephthalate resin (A) phase, a higher bridging effect within the polyalkylene terephthalate resin (A) phase by the glass fiber is established and the bulky glass fiber also acts as an extender for the polyalkylene terephthalate resin (A), resulting in further improvement in the heat resistance.

The aspect ratio is preferably at least 2.5 and more preferably at least 3 and is preferably not more than 5.5 and more preferably not more than 5. The shape of the long direction cross section is particularly preferably an approximately rectangular shape.

The area of the long direction cross section of the glass fiber preferably is greater than 180 μm$^2$ and not greater than 300 pmt. The use of such a cross-sectional area facilitates the polyalkylene terephthalate forming the matrix and facilitates improvement in the heat resistance as a result. This cross-sectional area more preferably is greater than 180 μm$^2$ and not greater than 250 μm$^2$ and still more preferably is greater than 180 μm$^2$ and not greater than 200 μm$^2$.

The size of the glass fiber is not particularly limited, but preferably the short diameter is 2 to 20 μm and the long diameter is approximately 5 to 50 μm.

The glass fiber (D) may be treated with a sizing agent or a surface treatment agent. The surface treatment may be carried out by adding the sizing agent or surface treatment agent separately from the untreated glass fiber during production of the resin composition according to the present invention.

The sizing agent can be exemplified by resin emulsions of, e.g., vinyl acetate resins, ethylene/vinyl acetate copolymers, acrylic resins, epoxy resins, polyurethane resins, and polyester resins.

The surface treatment agent can be exemplified by aminosilane compounds such as γ-aminopropyltriethoxysilane, γ-aminopropyltrimethoxysilane, and γ-(2-aminoethyl)aminopropyltrimethoxysilane; chlorosilane compounds such as vinyltrichlorosilane and methylvinyldichlorosilane; alkoxysilane compounds such as vinyltrimethoxysilane, vinyltriethoxysilane, vinyltriacetoxysilane, and γ-methacryloxypropyltrimethoxysilane; epoxysilane compounds such as β-(3, 4-epoxycylohexyl)ethyltrimethoxysilane and γ-glycidoxypropyltrimethoxysilane; acrylic compounds; isocyanate compounds; titanate compounds; and epoxy compounds.

Combinations of two or more of these sizing agents and combinations of two or more of these surface treatment agents may be used, and the use amount (amount of attachment), based on the mass of the glass fiber (D), is generally not more than 10 mass % and is preferably 0.05 to 5 mass %. Keeping the amount of attachment to not more than 10 mass % provides the necessary and sufficient effect while being economical.

Two or more species of glass fiber (D) may be used in combination in conformity to the required properties. The content of the glass fiber (D), per 100 mass parts of the total of the polyalkylene terephthalate resin (A) and polystyrene resin or rubber-reinforced polystyrene resin (B), is preferably 5 to 150 mass parts, more preferably 10 to 150 mass parts, even more preferably 10 to 120 mass parts, still more preferably 15 to 100 mass parts, particularly preferably 20 to 90 mass parts, and most preferably 30 to 80 mass parts. Incorporation in such a range enables a high degree of heat resistance to be achieved and facilitates increasing the shrinkage-reducing effect and the strength of the resulting molded article. The surface appearance of the molded article may be reduced when the content exceeds 150 mass parts, while little strength-improving effect is likely to occur at less than 5 mass parts.

In the structure of the cross section of a molded article of the resin composition according to the present invention, as observed with an electron microscope, the glass fiber (D) preferably is present in a state surrounded by the polyalkylene terephthalate resin (A) phase. In addition, the polyalkylene terephthalate resin (A) preferably forms the sea (matrix) in a sea-island structure or forms a co-continuous phase with the polystyrene resin or rubber-reinforced polystyrene resin (B). The presence of such a structural morphology brings about additional specific improvements in the heat resistance and facilitates the occurrence of an excellent low-warp behavior and also an excellent appearance.

Besides the glass fiber (D) described above and the carbon fiber (G) described below, the thermoplastic resin composition according to the present invention preferably also contains an additional plate-shaped, particulate, or amorphous inorganic filler. Plate-shaped inorganic fillers function to reduce the anisotropy and warping and can be exemplified by talc, glass flake, mica, kaolin, metal foil, and so forth. Glass flake is preferred among the plate-shaped inorganic fillers.

The additional particulate or amorphous inorganic fillers can be exemplified by ceramic beads, clay, zeolite, barium sulfate, titanium oxide, silicon oxide, aluminum oxide, magnesium hydroxide, zinc sulfide, and so forth.

The additional inorganic filler is preferably talc, titanium oxide, or zinc sulfide and is particularly preferably talc.

The content of the additional inorganic filler, per 100 mass parts of the total of the polyalkylene terephthalate resin (A) and polystyrene resin or rubber-reinforced polystyrene resin (B), is preferably 0.1 to 30 mass parts, more preferably at least 0.5 mass parts, and still more preferably at least 1 mass parts, and is more preferably not more than 20 mass parts.

[Brominated Flame Retardant (E)]

The thermoplastic resin composition according to the present invention preferably contains (E) a brominated flame retardant.

Various brominated flame retardants can be used for the brominated flame retardant (E). Preferred examples of such brominated flame retardants are brominated phthalimides, brominated polyacrylates, brominated polycarbonates, brominated epoxies, and brominated polystyrenes.

Preferred brominated phthalimides are given by the following general formula (1).

[C1]

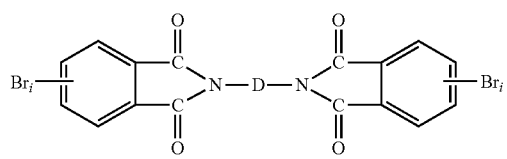

(1)

(In formula (1), D represents an alkylene group, alkyl ether group, diphenyl sulfone group, diphenyl ketone group, or diphenyl ether group. The i is an integer from 1 to 4.)

Brominated phthalimides given by the preceding general formula (1) can be exemplified by N,N'-(bistetrabromophthalimido)ethane, N,N'-(bistetrabromophthalimido)propane, N,N'-(bistetrabromophthalimido)butane, N,N'-(bistetrabromophthalimido) diethyl ether, N, N'-(bistetrabromophthalimido)dipropyl ether, N, N'-(bistetrabromophthalimido) dibutyl ether, N,N'-(bistetrabromophthalimido)diphenyl sulfone, N, N'-(bistetrabromophthalimido)diphenyl ketone, and N,N'-(bistetrabromophthalimido)diphenyl ether.

Preferred brominated phthalimides have an alkylene group for D in the preceding general formula (1), and brominated phthalimides having the following general formula (2) are particularly preferred.

[C2]

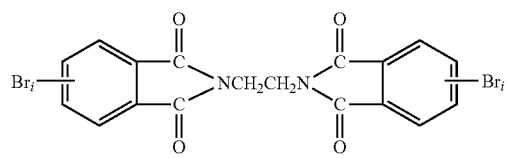

(2)

(In formula (2), i is an integer from 1 to 4.)

N,N'-ethylenebis(tetrabromophthalimide), in which the i in the preceding formula (2) is 4, is particularly preferred.

The bromine concentration in the brominated phthalimide is preferably 52 to 75 mass %, more preferably 56 to 73 mass %, and still more preferably 57 to 70 mass %. The maintenance of an excellent flame retardancy is facilitated by having the bromine concentration be in the indicated range.

The brominated polyacrylate is preferably a polymer obtained by the homopolymerization of a bromine atom-bearing benzyl (meth)acrylate, or by the copolymerization of two or more species of bromine atom-bearing benzyl (meth)acrylates, or by the copolymerization of bromine atom-bearing benzyl (meth)acrylate with additional vinyl monomer. The bromine atom here is preferably added on the benzene ring, and the number of added bromine atoms is preferably 1 to 5 per benzene ring and more preferably 4 to 5 per benzene ring.

The bromine atom-bearing benzyl acrylates can be exemplified by pentabromobenzyl acrylate, tetrabromobenzyl acrylate, tribromobenzyl acrylate, and their mixtures. Bromine atom-bearing benzyl methacrylates can be exemplified by methacrylates corresponding to these acrylates.

The following are specific examples of the additional vinyl monomer that may be used for copolymerization with the bromine atom-bearing benzyl (meth)acrylate: acrylic acid; acrylate esters such as methyl acrylate, ethyl acrylate, butyl acrylate, and benzyl acrylate; methacrylic acid; methacrylate esters such as methyl methacrylate, ethyl methacrylate, butyl methacrylate, and benzyl methacrylate; styrene; acrylonitrile; unsaturated carboxylic acids, e.g., fumaric acid and maleic acid, and their anhydrides; vinyl acetate; vinyl chloride; and so forth.

These are used, with reference to the bromine atom-bearing benzyl (meth)acrylate, generally at not more than an equimolar amount and preferably in an amount that is not more than 0.5-fold on a molar basis.

The following can also be used as the vinyl monomer: xylene diacrylate, xylene dimethacrylate, tetrabromoxylene diacrylate, tetrabromoxylene dimethacrylate, butadiene, isoprene, and divinylbenzene. These can generally be used in an amount that is not more than 0.5-fold on a molar basis with respect to the bromine atom-bearing benzyl acrylate or benzyl methacrylate.

The brominated polyacrylate is preferably a polymer obtained by the homopolymerization of a bromine atom-bearing acrylate monomer and particularly benzyl (meth) acrylate, or by the copolymerization of two or more of same, or by the copolymerization of same with additional vinyl monomer. The bromine atom here is preferably added on the benzene ring, and the number of added bromine atoms is preferably 1 to 5 per benzene ring and more preferably 4 to 5 per benzene ring.

Polypentabromobenzyl acrylate is preferred for the brominated polyacrylate from the standpoint of having a high bromine content and high electrical insulation characteristics (tracking resistance characteristic).

Preferred specific examples of the brominated polycarbonates are brominated polycarbonates obtained from brominated bisphenol A and particularly tetrabromobisphenol A. The terminal structure for this can be exemplified by the phenyl group, 4-t-butylphenyl group, 2,4,6-tribromophenyl group, and so forth, wherein the 2,4,6-tribromophenyl group is preferred for the terminal group structure.

The average number of carbonate repeat units in the brominated polycarbonate may be determined by selection as appropriate, but is generally 2 to 30. When the average number of carbonate repeat units is small, this may cause a decline in the molecular weight of the polybutylene terephthalate resin (A) during melting. Conversely, when too large, the melt viscosity becomes high, causing poor dispersion in the molded article, and the appearance of the molded article and particularly its gloss may be diminished. The average number of repeat units is thus preferably 3 to 15 and particularly preferably 3 to 10.

The molecular weight of the brominated polycarbonate is not particularly limited and may be determined by selection as appropriate, but the viscosity-average molecular weight is preferably 1,000 to 20,000 and is particularly preferably 2,000 to 10,000.

Brominated polycarbonate obtained from brominated bisphenol A can be obtained, for example, by a conventional method in which phosgene is reacted with the brominated bisphenol. The terminal blocking agent can be exemplified by aromatic monohydroxy compounds, which may be substituted by halogen or an organic group.

Preferred specific examples of the brominated epoxies are bisphenol A-type brominated epoxy compounds, as represented by tetrabromobisphenol A epoxy compounds and glycidyl brominated bisphenol A epoxy compounds.

The molecular weight of the brominated epoxy compound is not particularly limited and may be determined by selection as appropriate, but the mass-average molecular weight (Mw) is preferably 3,000 to 100,000 with higher molecular weights in this range being preferred. Specifically, Mw is preferably 10,000 to 80,000, more preferably 13,000 to 78,000, still more preferably 15,000 to 75,000, and particularly preferably 18,000 to 70,000, wherein higher molecular weights in these ranges are again preferred.

The epoxy equivalent weight of the brominated epoxy compound is preferably 3,000 to 40,000 g/eq, more preferably 4,000 to 35,000 g/eq, and particularly preferably 10,000 to 30,000 g/eq.

A brominated epoxy oligomer may also be co-used as a brominated epoxy. In such a case, for example, the use of 0 to approximately 50 mass % of an oligomer having an Mw of not more than 5,000 makes it possible to make appropriate adjustments to the flame retardancy, mold releasability, and flowability. The bromine atom content in the brominated epoxy compound is not particularly limited, but, viewed from the standpoint of imparting a satisfactory flame retardancy, is generally at least 10 mass %, preferably at least 20 mass %, and particularly preferably at least 30 mass %, with the upper limit being preferably 60 mass % and more preferably not more than 55 mass %.

Brominated polystyrenes can be exemplified by brominated polystyrenes containing the repeat unit given by the following general formula (3).

[C3]

(In formula (3), t is an integer from 1 to 5 and n is the number of repeat units.)

The brominated polystyrene may be produced by the bromination of a polystyrene or by the polymerization of brominated styrene monomer, but the polymerization of brominated styrene is preferred because the amount of free bromine (atoms) is then small.

The CH group bonded to the brominated benzene in the preceding general formula (3) may be substituted by a methyl group. The brominated polystyrene may be a copolymer provided by copolymerization with other vinyl monomer. The vinyl monomer in this case can be exemplified by styrene, α-methylstyrene, acrylonitrile, methyl acrylate, butadiene, vinyl acetate, and so forth. A single species of brominated polystyrene may be used, or a mixture of two or more brominated polystyrenes having different structures may be used, and the brominated polystyrene may contain, in the individual molecular chain, units derived from styrene monomers having different numbers of bromines.

The brominated polystyrene can be specifically exemplified by poly(4-bromostyrene), poly(2-bromostyrene), poly(3-bromostyrene), poly(2,4-dibromostyrene), poly(2,6-dibromostyrene), poly(2,5-dibromostyrene), poly(3,5-dibromostyrene), poly(2,4,6-tribromostyrene), poly(2,4,5-tribromostyrene), poly(2,3,5-tribromostyrene), poly(4-bromo-α-methylstyrene), poly(2,4-dibromo-α-methylstyrene), poly(2,5-dibromo-α-methylstyrene), poly(2,4,6-tribromo-α-methylstyrene), and poly(2,4,5-tribromo-α-methylstyrene), wherein the use is particularly preferred of poly(2,4,6-tribromostyrene), poly(2,4,5-tribromostyrene), and polydibromostyrenes and polytriboromostyrenes containing an average of 2 to 3 bromine groups on the benzene ring.

The number of repeat units n (average degree of polymerization) in the preceding general formula (3) for the bromoninated polystyrene is preferably 30 to 1,500, more preferably 150 to 1,000, and particularly preferably 300 to 800. Blooming readily occurs when the average degree of polymerization is less than 30, while at above 1,500 poor dispersion readily occurs and the mechanical properties readily decline. The mass-average molecular weight (Mw) of the brominated polystyrene is preferably 5,000 to 500,000, more preferably 10,000 to 500,000, even more preferably 10,000 to 300,000, still more preferably 10,000 to 100,000, and particularly preferably 10,000 to 70,000.

In the particular case of the brominated polystyrene provide by the bromination of polystyrene as referenced above, the mass-average molecular weight (Mw) is preferably 50,000 to 70,000, while in the case of a brominated polystyrene provided by polymerization, the mass-average molecular weight (Mw) is preferably approximately 10,000 to 30,000. The mass-average molecular weight (Mw) can be determined by GPC measurement as the value as standard polystyrene.

The bromine concentration in the brominated polystyrene is preferably 52 to 75 mass %, more preferably 56 to 70 mass %, and still more preferably 57 to 67 mass %. The maintenance of an excellent flame retardancy is facilitated by having the bromine concentration be in the indicated range.

Brominated phthalimides and brominated polyacrylates provide a particularly high heat resistance for the resin composition provided by their incorporation and are thus preferred among the preceding for the brominated flame retardant (E).

The content of the brominated flame retardant (E) in the thermoplastic resin composition according to the present invention is preferably 10 to 50 mass parts per 100 mass parts of the total of the polybutylene terephthalate resin (A) and the polystyrene resin or rubber-reinforced polystyrene resin (B).

The flame retardancy readily becomes inadequate when the content of the brominated flame retardant (E) is less than 10 mass parts. Conversely, at more than 50 mass parts, the impact resistance and flowability readily become unsatisfactory and the appearance is facilitated of a reduction in the mechanical properties and mold releasability and the problem of flame retardant bleed out. The content of the brominated flame retardant (E) is more preferably at least 13 mass parts and still more preferably at least 15 mass parts and is more preferably not more than 45 mass parts, still more preferably not more than 40 mass parts, even more preferably not more than 35 mass parts, especially preferably not more than 30 mass parts, and particularly preferably not more than 25 mass parts.

[Antimony Compound (F)]

The thermoplastic resin composition according to the present invention preferably contains an antimony compound that is a co-flame retardant.

The antimony compound (F) is preferably antimony trioxide ($Sb_2O_3$), antimony pentoxide ($Sb_2O_5$), sodium antimonate, and so forth, wherein antimony trioxide is particularly preferred.

For antimony trioxide, the mass proportion in the resin composition of the bromine atom from the brominated flame retardant (E) and the antimony atom from the antimony compound (F) is, for the total of the two, preferably 3 to 25 mass %, more preferably 4 to 22 mass %, and still more preferably 10 to 20 mass %. A declining trend for the flame retardancy occurs at less than 3 mass %, while a declining trend for the mechanical strength occurs at above 25 mass %. In addition, the mass ratio (Br/Sb) between the bromine atom and antimony atom is preferably 0.3 to 5 and more preferably 0.3 to 4. The appearance of flame retardancy tends to be facilitated when this range is employed, which is thus preferred.

The antimony compound (F) is preferably blended as a masterbatch with thermoplastic resin and preferably with the polybutylene terephthalate resin (A). This serves to facilitate the presence of the antimony compound (F) in the polybutylene terephthalate resin (A) phase, to provide an excellent heat stability during melt-kneading and the molding process, to suppress reductions in the impact resistance, and to establish a tendency for there to be little variability in the flame retardancy and impact resistance.

The content of the antimony compound (F) in the masterbatch is preferably 20 to 90 mass %. When the antimony compound (F) is less than 20 mass %, the proportion of the antimony compound in the flame retardant masterbatch is then low, which facilitates the occurrence of a low flame retardancy-improving effect for the polybutylene terephthalate resin (A) in which such a masterbatch is blended. On the other hand, it is disadvantageous for the antimony compound (F) to exceed 90 mass %, as follows: the dispersity of the antimony compound readily declines and an unstable flame retardancy is exhibited by the resin composition provided when such a masterbatch is blended into the polybutylene terephthalate resin (A); in addition, the processability during masterbatch production readily declines, for example, during production using an extruder, problems readily occur such as an unstable strand and facile strand scission.

The content of the antimony compound (F) in the masterbatch is more preferably at least 30 mass %, still more preferably at least 40 mass %, even more preferably at least 50 mass %, particularly preferably at least 60 mass %, and most preferably at least 70 mass %. The upper limit is more preferably not more than 85 mass % and still more preferably not more than 80 mass %.

The content of the antimony compound (F), per 100 mass parts of the total of the polybutylene terephthalate resin (A) and the polystyrene resin or rubber-reinforced polystyrene resin (B), is preferably 0.1 to 30 mass parts, more preferably 1 to 20 mass parts, still more preferably 2 to 15 mass parts, even more preferably at least 3 mass parts, and particularly preferably at least 5 mass %, and is preferably not more than 13 mass parts, more preferably not more than 12 mass parts, and particularly preferably not more than 10 mass parts. The flame retardancy readily declines at below the indicated value of the lower limit. At above the indicated value of the upper limit, the crystallization temperature readily declines and the mold releasability readily deteriorates and the mechanical properties, e.g., impact resistance and so forth, readily decline.

[Carbon Fiber (G)]

The thermoplastic resin composition according to the present invention preferably contains a carbon fiber (G). Any of, for example, a PAN type (polyacrylonitrile type), pitch type, rayon type, and so forth can be used for the carbon fiber (G). PAN type carbon fibers are preferred.

The average fiber diameter of the carbon fiber (G) is preferably not more than 10 μm from the standpoint of mechanical strength, and is most preferably in the range of 5 to 8 μm from the standpoint of the balance between the flowability and appearance.

The number-average fiber length of the carbon fiber (G) is preferably at least 0.2 mm and more preferably at least 0.4 mm, and the upper limit on the number-average fiber length is preferably not more than 10 mm, more preferably not more than 8 mm, still more preferably not more than 7 mm, and even more preferably not more than 6 mm.

The carbon fiber (G) has preferably been subjected to a surface treatment, thereby improving the tensile strength and bending strength at the level of the resin composition. Any conventionally used surface treatment agent can be used, for example, epoxy sizing agents, urethane sizing agents, epoxy-urethane sizing agents, polyamide sizing agents, olefin sizing agents, and so forth. Preferred among the preceding are epoxy sizing agents, polyamide sizing agents, and urethane sizing agents.

The amount of the surface treatment agent, per 100 mass parts of the carbon fiber (G), is preferably in the range of 0.5 to 15 mass parts and is more preferably in the range of 1 to 10 mass parts.

The content of the carbon fiber (G) in the thermoplastic resin composition according to the present invention is preferably 5 to 100 mass parts per 100 mass parts of the total of the polybutylene terephthalate resin (A) and polystyrene resin or rubber-reinforced polystyrene resin (B). An inadequate rigidity readily occurs when the content of the carbon fiber (G) is less than 5 mass parts. Conversely, at above 100 mass parts, an inadequate impact resistance and an inadequate flowability readily occur and production is readily impaired. The content of the carbon fiber (G) is more preferably at least 10 mass parts, and is more preferably not more than 80 mass parts, still more preferably not more than 60 mass parts, even more preferably not more than 50 mass parts, especially preferably not more than 40 mass parts, and particularly preferably not more than 30 mass parts.

When a carbon fiber (G) is incorporated, the thermoplastic resin composition is light weight and its specific gravity is preferably in the range of 1.0 to 1.33. This specific gravity is the value measured in accordance with ISO 1183.

[Stabilizer]

The thermoplastic resin composition according to the present invention preferably contains a stabilizer from the standpoint of improving the heat stability and exercising an effect that prevents deterioration of the mechanical strength, transparency, and color. Phosphorus stabilizers, sulfur stabilizers, and phenolic stabilizers are preferred for the stabilizer.

The phosphorus stabilizers can be exemplified by phosphorous acid, phosphoric acid, esters of phosphorous acid (phosphites), trivalent phosphoric acid esters (phosphonites), and pentavalent phosphoric acid esters (phosphates), with phosphites, phosphonites, and phosphates being preferred.

The organophosphate compounds preferably are compounds given by the following general formula.

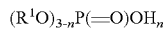

$(R^1O)_{3-n}P(=O)OH_n$ (In the formula, each $R^1$ independently represents an alkyl group or aryl group. n represents an integer from 0 to 2.) Long-chain alkyl acid phosphate compounds in which $R^1$ has 8 to 30 carbon atoms are more preferred. Alkyl groups having 8 to 30 carbon atoms can be specifically exemplified by the octyl group, 2-ethylhexyl group, isooctyl group, nonyl group, isononyl group, decyl group, isodecyl group, dodecyl group, tridecyl group, isotridecyl group, tetradecyl group, hexadecyl group, octadecyl group, eicosyl group, and triacontyl group.

The long-chain alkyl acid phosphates can be exemplified by octyl acid phosphate, 2-ethylhexyl acid phosphate, decyl acid phosphate, lauryl acid phosphate, octadecyl acid phosphate, oleyl acid phosphate, behenyl acid phosphate, phenyl acid phosphate, nonylphenyl acid phosphate, cyclohexyl acid phosphate, phenoxyethyl acid phosphate, alkoxypolyethylene glycol acid phosphate, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate, and bis-nonylphenyl acid phosphate. Octadecyl acid phosphate is preferred among the preceding, and is commercially available from the ADEKA Corporation under the trade name "Adeka Stab AX-71".

The organophosphite compounds are preferably, for example, compounds given by the following general formula.

$R^2O-P(OR^3)(OR^4)$ (In the formula, $R^2$, $R^3$, and $R^4$ are each independently a hydrogen atom, alkyl group having 1 to 30 carbon atoms, or aryl group having 6 to 30 carbon atoms, and at least one of $R^2$, $R^3$, and $R^4$ is an aryl group having 6 to 30 carbon atoms.)

The organophosphite compounds can be exemplified by triphenyl phosphite, tris(nonylphenyl) phosphite, dilauryl hydrogen phosphite, triethyl phosphite, tridecyl phosphite, tris(2-ethylhexyl) phosphite, tris(tridecyl) phosphite, tristearyl phosphite, diphenyl monodecyl phosphite, monophenyl didecyl phosphite, diphenyl mono(tridecyl) phosphite, tetraphenyl dipropylene glycol diphosphite, tetraphenyl tetra(tridecyl) pentaerythritol tetraphosphite, hydrogenated bisphenol A phenol phosphite polymer, diphenyl hydrogen phosphite, 4,4'-butylidenebis(3-methyl-6-tert-butylphenyl di(tridecyl) phosphite), tetra(tridecyl) 4,4'-isopropylidene diphenyl diphosphite, bis(tridecyl) pentaerythritol diphosphite, bis(nonylphenyl) pentaerythritol diphosphite, dilauryl pentaerythritol diphosphite, distearyl pentaerythritol diphosphite, tris(4-tert-butylphenyl) phosphite, tris(2,4-di-tert-butylphenyl) phosphite, hydrogenated bisphenol A pentaerythritol phosphite polymer, bis(2,4-di-tert-butylphenyl) pentaerythritol diphosphite, bis(2,6-di-tert-butyl-4-methylphenyl) pentaerythritol diphosphite, 2,2'-methylenebis(4,6-di-tert-butylphenyl) octyl phosphite, and bis(2,4-dicumylphenyl) pentaerythritol diphosphite. Bis (2,6-di-tert-butyl-4-methylphenyl) pentaerythritol diphosphite is preferred among the preceding.

The organophosphonite compounds are preferably, for example, compounds given by the following general formula.

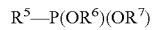

$R^5-P(OR^6)(OR^7)$ (In the formula, $R^5$, $R^6$, and $R^7$ are each independently a hydrogen atom, alkyl group having 1 to 30 carbon atoms, or aryl group having 6 to 30 carbon atoms, and at least one of $R^5$, $R^6$, and $R^7$ is an aryl group having 6 to 30 carbon atoms.)

The organophosphonite compounds can be exemplified by tetrakis(2,4-di-isopropylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-isopropylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, and tetrakis(2,6-di-tert-butylphenyl)-3,3'-biphenylene diphosphonite.

Any heretofore known sulfur atom-containing compound can be used as the sulfur stabilizer, among which thioethers are preferred. Specific examples are didodecyl thiodipropionate, ditetradecyl thiodipropionate, dioctadecyl thiodipropionate, pentaerythritol tetrakis(3-dodecylthiopropionate), thiobis(N-phenyl-β-naphthylamine), 2-mercaptobenzothiazole, 2-mercaptobenzoimidazole, tetramethylthiuram monosulfide, tetramethylthiuram disulfide, nickel dibutyldithiocarbamate, nickel isopropylxanthate, and trilauryl trithiophosphite. Pentaerythritol tetrakis(3-dodecylthiopropionate) is preferred among the preceding.

The phenolic stabilizers can be exemplified by pentaerythritol tetrakis(3-(3,5-di-t-butyl-4-hydroxyphenyl) propionate), octadecyl 3-(3,5-di-tert-butyl-4-hydroxyphenyl) propionate, thiodiethylene bis(3-(3,5-di-tert-butyl-4-hydroxyphenyl) propionate), and pentaerythritol tetrakis(3-(3,5-dineopentyl-4-hydroxyphenyl) propionate). Pentaerythritol tetrakis(3-(3,5-di-t-butyl-4-hydroxyphenyl) propionate)

and octadecyl 3-(3,5-di-tert-butyl-4-hydroxyphenyl)propionate are preferred among the preceding.

A single stabilizer may be incorporated or two or more may be incorporated in any combination and any ratio.

The content of the stabilizer is preferably 0.001 to 2 mass parts based on 100 mass parts for the total of the polyalkylene terephthalate resin (A) and the polystyrene resin or rubber-reinforced polystyrene resin (B). When the stabilizer content is less than 0.001 mass parts, there can be little expectation of improvement in the heat stability or compatibility of the resin composition and the occurrence of a reduction in molecular weight and deterioration in color during molding is facilitated. When 2 mass parts is exceeded, this becomes an excessive amount and a trend is established wherein the occurrence of silver production and color degradation is further facilitated. The stabilizer content is more preferably 0.01 to 1.5 mass parts and is still more preferably 0.1 to 1 mass parts.

[Mold-Release Agent]

The thermoplastic resin composition according to the present invention preferably contains a mold-release agent. Heretofore known mold-release agents conventionally used in polyester resins can be used as this mold-release agent, whereamong polyolefin compounds and fatty acid ester compounds are preferred from the standpoint of alkali resistance and polyolefin compounds are particularly preferred.

The polyolefin compounds can be exemplified by paraffin waxes and polyethylene waxes, with those having a weight-average molecular weight of 700 to 10,000 being preferred and those having a weight-average molecular weight of 900 to 8,000 being more preferred.

The fatty acid ester compounds can be exemplified by the esters of saturated or unsaturated, monovalent or divalent aliphatic carboxylic acids, and by fatty acid esters, e.g., glycerol/fatty acid esters and sorbitan/fatty acid esters, and their partial saponification products. Preferred thereamong are fatty acid monoesters and fatty acid diesters constituted of an alcohol and a fatty acid having 11 to 28 and preferably 17 to 21 carbons.

The fatty acid can be exemplified by palmitic acid, stearic acid, caproic acid, capric acid, lauric acid, arachic acid, behenic acid, lignoceric acid, cerotic acid, melissic acid, tetraacontanoic acid, montanic acid, adipic acid, and azelaic acid. The fatty acid may also be an alicyclic structure.

The alcohol can be exemplified by saturated or unsaturated, monohydric or polyhydric alcohols. These alcohols may have a substituent such as a fluorine atom, aryl group, and so forth. Preferred thereamong are monohydric or polyhydric saturated alcohols having not more than 30 carbons, with aliphatic saturated monohydric alcohols and polyhydric alcohols having not more than 30 carbons being more preferred. Here, aliphatic also encompasses alicyclic structures.

The alcohol under consideration can be specifically exemplified by the following: octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylolpropane, and dipentaerythritol.

The ester compound under consideration may contain aliphatic carboxylic acid and/or alcohol as impurities, and may be a mixture of a plurality of compounds.

Specific examples of the aliphatic ester compounds are glycerol monostearate, glycerol monobehenate, glycerol dibehenate, glycerol 12-hydroxymonostearate, sorbitan monobehenate, pentaerythritol monostearate, pentaerythritol distearate, stearyl stearate, and ethylene glycol/montanic acid ester.

Based on 100 mass parts for the total of the polyalkylene terephthalate resin (A) and the polystyrene resin or rubber-reinforced polystyrene resin (B), the content of the mold-release agent is preferably 0.1 to 3 mass parts, more preferably 0.2 to 2.5 mass parts, and even more preferably 0.3 to 2 mass parts. At less than 0.1 mass parts, the surface properties readily decline due to poor mold release during melt molding; at more than 3 mass parts, on the other hand, the kneading workability of the resin composition readily declines and in addition fogging of the surface of the molded article is readily produced.

[Carbon Black]

The thermoplastic resin composition according to the present invention preferably contains carbon black.

There are no limitations on the carbon black with regard to its type, type of starting material, and method of production, and any of furnace black, channel black, acetylene black, Ketjen black, and so forth can be used. The number-average particle diameter is not particularly limited, but approximately 5 to 60 nm is preferred.

The carbon black is preferably blended in the form of a masterbatch provided by preliminary mixing with a thermoplastic resin, preferably a polyalkylene terephthalate resin and particularly preferably a polybutylene terephthalate resin.

Based on 100 mass parts for the total of the polyalkylene terephthalate resin (A) and the polystyrene resin or rubber-reinforced polystyrene resin (B), the content of the carbon black is preferably 0.1 to 4 mass parts and more preferably 0.2 to 3 mass parts. At less than 0.1 mass parts, the desired color may not be obtained and the weatherability-improving effect may be inadequate. The mechanical properties may decline at above 4 mass parts.

[Other Constituent Components]

Besides the polyalkylene terephthalate resin (A), polystyrene resin or rubber-reinforced polystyrene resin (B), polycarbonate resin, and styrene-maleic acid copolymer that have been described in the preceding, the thermoplastic resin composition according to the present invention may contain additional thermoplastic resin within a range in which the effects of the present invention are not impaired. This additional thermoplastic resin can be exemplified by polyacetal resins, polyamide resins, polyphenylene oxide resins, polyphenylene sulfide resins, polysulfone resins, polyethersulfone resins, polyetherimide resins, polyetherketone resins, and polyolefin resins.

When this additional resin is incorporated, its content, per 100 mass parts of the total of the polyalkylene terephthalate resin (A) and polystyrene resin or rubber-reinforced polystyrene resin (B), is preferably not more than 20 mass parts, more preferably not more than 10 mass parts, even more preferably not more than 5 mass parts, and particularly preferably not more than 3 mass parts.

The thermoplastic resin composition according to the present invention may contain various additives other than those described in the preceding. These additives can be exemplified by flame retardants, co-flame retardants, antidripping agents, ultraviolet absorbers, static inhibitors, antifogging agents, antiblocking agents, plasticizers, dispersing agents, antibacterial agents, colorants, dyes, pigments, and so forth.

[Production of the Thermoplastic Resin Composition]

The thermoplastic resin composition according to the present invention can be produced according to common methods for the preparation of resin compositions. Thus, the polyalkylene terephthalate resin (A) and the polystyrene resin or rubber-reinforced polystyrene resin (B), as well as the various additives and additional resin component that are added as desired, are thoroughly mixed together and are than melt-kneaded using a single-screw or twin-screw extruder. In addition, a particular component need not be premixed, or only a portion thereof may be premixed, and it may then be fed to the extruder using a feeder and the resin composition may be prepared by melt-kneading. Melt-kneading may also be carried out by blending a masterbatch of a portion. Moreover, various molded articles can also be produced without melt-kneading the mixture provided by premixing the components, in which case this mixture is fed as such to a molder, e.g., an injection molder.

The heating temperature during melt-kneading can be selected as appropriate generally from the range of 220 to 300° C. When this temperature is too high, the generation of decomposition gases may be facilitated, which may cause problems with the appearance. The screw structure is thus desirably selected considering, for example, heat generation due to shear. The use of an oxidation inhibitor and/or a heat stabilizer is desirable in order to suppress decomposition during kneading and during the ensuing molding process.

[Molded Articles]

The method for producing a molded article using the thermoplastic resin composition according to the present invention is not particularly limited, and any of the molding methods commonly used with thermoplastic resin compositions can be adopted. Examples here are injection molding methods, ultrahigh speed injection molding methods, injection compression molding methods, two-color molding methods, hollow molding methods such as gas-assisted moldings, molding methods using insulated molds, molding methods using rapidly heated molds, foam molding (also including molding methods using supercritical fluids), insert molding, IMC (in-mold coating molding) molding methods, extrusion molding methods, sheet molding methods, thermoforming methods, rotational molding methods, laminate molding methods, press molding methods, blow molding methods, and so forth. Injection molding methods are preferred among the preceding from the standpoints of productivity and providing good surface properties for the resulting molded article, and because the effects of the present invention are significant.

The obtained molded articles have a high heat resistance, an excellent low-warp behavior and appearance, as well as an excellent mechanical strength, chemical resistance, and flame retardancy and are thus suitably used for electrical and electronic device parts and automotive internal and external parts and electrical equipment parts, where such properties are rigorously required. The electrical and electronic device parts can be specifically exemplified by housing parts for IH cooking appliances, button storage boxes, grill handles, coil peripheral members, rice cooker protective frames, relay casings, smart meter housings, industrial breaker housings, inverter casings, mobile phone housings, warm equipment housings, battery separators, battery cases, electronic component transport trays, battery transport trays, automobile charging equipment, and so forth.

The molded articles are particularly suitable for use for automotive interior and exterior parts, e.g., housings for vehicle-mounted batteries, covers for vehicle-mounted batteries, separators for vehicle-mounted batteries, various motor cases, sensor cases, camera cases, holder parts, air conditioner flow direction control plates, door mirror stays, housings for automotive heads-up displays, housings for engine control units (ECU), and so forth, and for connector parts for automotive electrical devices and so forth.

EXAMPLES

The present invention is more specifically described in the following using examples. However, the present invention should not be construed as being limited to or by the following examples.

Examples I-1 to I-7 and Comparative Examples I-1 to I-7

The following Table 1 provides the components that were used.

TABLE 1

| component | designation | |
|---|---|---|
| polyalkylene terephthalate (A) | A1 | polybutylene terephthalate resin IV = 0.70 dl/g, Mw = 45,300 |
| | A2 | polybutylene terephthalate resin IV = 1.20 dl/g, Mw = 91,200 |
| | A3 | polybutylene terephthalate resin IV = 0.85 dl/g, Mw = 63,500 |
| | A4 | polybutylene terephthalate resin IV = 0.60 dl/g, Mw = not greater than 40,000 |
| | A5 | polyethylene terephthalate resin "PBK1", Nippon Unipet Co., Ltd. IV = 0.64 dl/g, Mw = 48,000 |
| polystyrene or HIPS (B) | B1 | HIPS (rubber-reinforced polystyrene) melt viscosity (250° C., 912 sec$^{-1}$) = 132 Pa · s Mw = 190,000 |
| | B2 | polystyrene melt viscosity (250° C., 912 sec$^{-1}$) = 64 Pa · s Mw = 190,000 |
| | B3 | HIPS (rubber-reinforced polystyrene) melt viscosity (250° C., 912 sec$^{-1}$) = 73 Pa · s Mw = 140,000 |
| styrene-acrytonitrile copolymer | BX | styrene-acrylonitrile copolymer melt viscosity (250° C., 912 sec$^{-1}$) = 244 Pa · s Mw = 325,000 |
| glass fiber (D) | D | "T-187", Nippon Electric Glass Co., Ltd. |
| compatibilizer (C) | C1 | "Iupilon H4000" poly-carbonate resin Mitsubishi Engineering-Plastics Corporation Mv = 16,000 |
| | C2 | styrene-maleic anhydride copolymer "XIRAN SZ08250", Polyscope Polymers BV |
| talc | E | "NLC92RC", Nippon Talc Co., Ltd. |
| phosphorus stabilizer | F1 | octadecyl acid phosphate "AX-71", ADEKA Corporation |
| phenolic stabilizer | F2 | hindered phenolic oxidation inhibitor " AO-60", ADEKA Corporation |
| mold release agent | F3 | montanic acid wax "Licowax E", Clariant AG |
| carbon black MB | F4 | carton black masterbatch polybutylene terephthalate base/ CB concentration = 19% |

Using the proportions (mass parts in all instances) given in the following Table 2, the components given in the preceding Table 1 were mixed to uniformity using a tumbler mixer. This was followed by melt-kneading using a twin-screw extruder ("TEX30α", L/D=42, The Japan Steel Works, Ltd.) and conditions of a cylinder set temperature of 260° C., an extrusion rate of 40 kg/h, and a screw rotation rate of 200 rpm, to provide a resin composition. The resin composition was quenched in a water bath and was pelletized using a pelletizer to yield pellets of a thermoplastic resin composition.

[MVR]

For the MVR, the melt flow volume MVR per unit time (unit: cm³/10 min) was measured on the thusly obtained pellets using a melt indexer from Takara Kogyo Co., Ltd. and conditions of 265° C. and a load of 5 kgf.

[Tensile Strength at Break, Tensile Elongation at Break]

The pellets obtained as described above were dried for 5 hours at 120° C. and were then injection molded using an injection molder from The Japan Steel Works, Ltd. (mold clamping force=85T) under conditions of a cylinder temperature of 250° C. and a mold temperature of 80° C. to give an ISO multipurpose test specimen (thickness=4 mm).

The tensile strength at break (unit: MPa) and the tensile elongation at break (unit: %) were measured based on ISO 527 using the ISO multipurpose test specimen (thickness=4 mm).

[Maximum Bending Strength, Bending Modulus]

The maximum bending strength (unit: MPa) and bending modulus (unit: MPa) were measured at a temperature of 23° C. based on ISO 178 using the ISO multipurpose test specimen (thickness=4 mm).

[Notched Charpy Impact Strength]

Using a notched test specimen provided by introducing a notch into the aforementioned ISO multipurpose test specimen (thickness=4 nm), the notched Charpy impact strength (unit: kJ/m²) was measured at a temperature of 23° C. based on ISO 179.

[Deflection Temperature Under Load and Heat Resistance Rating]

Using the aforementioned ISO multipurpose test specimen (thickness=4 mm), the deflection temperature under load was measured based on ISO 75-1 and ISO 75-2 using a load condition of 1.80 MPa.

The heat resistance was rated using the following criteria.

A: the deflection temperature under load is equal to or greater than 150° C.

B: the deflection temperature under load is equal to or greater than 130° C. and less than 150° C.

C: the deflection temperature under load is less than 130° C.

[Amount of Warping and Warping Rating]

A 1.6 mm-thick disk having a diameter of 100 mm was molded using an injection molder ("NEX80", Nissei Plastic Industrial Co., Ltd.), a side-gate mold, and conditions of a cylinder temperature of 260° C. and a mold temperature of 80° C., and the amount of warping (unit: nm) of the disk was determined.

The warping was evaluated and rated using the following criteria.

A: the amount of warping is less than 1 mm

B: the amount of warping is equal to or greater than 1 mm and less than 3 mm

C: the amount of warping is equal to or greater than 3 mm

These results are given in the following Table 2.

TABLE 2

| | | Example I- | | | | | | |
|---|---|---|---|---|---|---|---|---|
| | | 1 | 2 | 3 | 4 | 5 | 6 | 7 |
| polyalkylene terephthalate | A1 | 33.33 | 42.85 | 39.60 | 30.34 | 47.36 | | |
| | A2 | | | | | | | |
| | A3 | | | | | | | |
| | A4 | | | | | | 33.33 | 42.85 |
| | A5 | | | | 10.11 | | | |
| polystyrene or HIPS | B1 | 66.67 | 57.15 | 60.40 | 49.44 | 52.64 | 66.67 | 57.15 |
| | B2 | | | | | | | |
| | B3 | | | | | | | |
| stynene-acrylonitrile copolymer | BX | | | | | | | |
| glass fiber (D) | D | 49.16 | 50.57 | 57.01 | 46.66 | 46.58 | 49.16 | 50.57 |
| compatibilizer (C) | C1 | 11.11 | 14.30 | 12.31 | | | 11.11 | 14.30 |
| | C2 | | | | | 5.28 | | |
| talc | E | | | 19.00 | 15.55 | | | |
| phosphorus stabilizer | F1 | 0.16 | 0.17 | 0.19 | 0.16 | 0.16 | 0.16 | 0.17 |
| phenolic stabilizer | F2 | 0.49 | 0.51 | 0.57 | 0.47 | 0.47 | 0.49 | 0.51 |
| mold release agent | F3 | 0.82 | 0.84 | 0.95 | 0.78 | 0.78 | 0.82 | 0.84 |
| carbon black MB | F4 | 2.13 | 2.19 | 2.47 | 2.02 | 2.02 | 2.13 | 2.19 |
| $IV_A$ (dl/g) | | 0.70 | 0.70 | 0.70 | 0.69 | 0.70 | 0.60 | 0.60 |
| quantity ratio of (A)/$IV_A$ | | 47.62 | 61.22 | 56.58 | 43.97 | 67.66 | 55.56 | 71.42 |
| quantity ratio of (B)/($n_B$/80) | | 40.40 | 34.63 | 36.60 | 29.96 | 31.90 | 40.40 | 34.63 |
| MVR [cm³/10 min] | | 48.5 | 51.5 | 41.5 | 45.1 | 50.4 | 51.4 | 54.3 |
| tensile strength at break [MPa] | | 103 | 111 | 109 | 87 | 108 | 105 | 110 |
| tensile elongation at break [%] | | 2 | 2 | 2 | 1 | 2 | 2 | 2 |
| maximum bendingstrength [MPa] | | 162 | 171 | 170 | 147 | 168 | 160 | 170 |
| bending modulus [MPa] | | 8875 | 9022 | 11085 | 11478 | 9050 | 8759 | 8935 |
| notched Charpy impact strength [kJ/m²] | | 9.8 | 9.8 | 9.5 | 7.8 | 9.5 | 10.7 | 10.6 |
| deflection temperature under load [° C.] | | 154 | 167 | 176 | 169 | 167 | 164 | 176 |
| heat resistance rating | | A | A | A | A | A | A | A |
| amount of warping [mm] | | <1 | <1 | <1 | <1 | <1 | <1 | <1 |
| rating of low-warp behavior | | A | A | A | A | A | A | A |

TABLE 2-continued

|  |  | Comparative Example I- | | | | | | |
|---|---|---|---|---|---|---|---|---|
|  |  | 1 | 2 | 3 | 4 | 5 | 6 | 7 |
| polyalkylene | A1 |  | 72.97 | 33.33 | 15.79 |  | 38.02 | 33.33 |
| terephthalate | A2 | 39.60 |  |  |  |  |  |  |
|  | A3 |  |  |  |  | 33.33 |  |  |
|  | A4 |  |  |  |  |  |  |  |
|  | A5 |  |  |  |  |  |  |  |
| polystyrene | B1 | 60.40 | 27.03 |  | 84.21 | 66.67 |  |  |
| or HIPS | B2 |  |  | 66.67 |  |  |  |  |
|  | B3 |  |  |  |  |  |  | 66.67 |
| stynene-acrylonitrile copolymer | BX |  |  |  |  |  | 61.98 |  |
| glass fiber (D) | D | 57.01 | 47.69 | 49.16 | 46.58 | 49.16 | 49.78 | 49.16 |
| compatibilizer (C) | C1 | 12.31 | 8.11 | 11.11 | 5.26 | 11.11 | 12.68 | 11.11 |
|  | C2 |  |  |  |  |  |  |  |
| talc | E | 19.00 |  |  |  |  |  |  |
| phosphorus stabilizer | F1 | 0.19 | 0.16 | 0.16 | 0.16 | 0.16 |  | 0.16 |
| phenolic stabilizer | F2 | 0.57 | 0.48 | 0.48 | 0.47 | 0.49 | 0.50 | 0.49 |
| mold release agent | F3 | 0.95 | 0.48 | 0.82 | 0.78 | 0.82 | 0.83 | 0.82 |
| carbon black MB | F4 | 2.47 | 2.07 | 2.13 | 2.02 | 2.13 | 2.16 | 2.13 |
| $IV_A$ (dl/g) |  | 1.20 | 0.70 | 0.70 | 0.70 | 0.85 | 0.70 | 0.70 |
| quantity ratio of (A)/$IV_A$ |  | 33.00 | 104.25 | 47.62 | 22.56 | 39.22 | 54.31 | 47.62 |
| quantity ratio of (B)/$n_B$/80 |  | 36.60 | 16.38 | 83.33 | 51.04 | 40.40 | 20.32 | 73.06 |
| MVR [cm³/10 min] |  | 11.6 | 62.1 | 56.5 | 40.7 | 33.7 | 72.8 | 83.3 |
| tensile strength at break [MPa] |  | 96 | 113 | 95 | 88 | 106 | 118 | 106 |
| tensile elongation at break [%] |  | 2 | 2 | 2 | 1 | 2 | 1 | 2 |
| maximum bendingstrength [MPa] |  | 168 | 175 | 165 | 150 | 167 | 160 | 154 |
| bending modulus [MPa] |  | 11229 | 8920 | 8902 | 8750 | 9330 | 10375 | 9459 |
| notched Charpy impact strength [kJ/m²] |  | 7.7 | 10 | 8.3 | 8.7 | 8.8 | 7.8 | 10.6 |
| deflection temperature under load [° C.] |  | 120 | 185 | 125 | 106 | 132 | 129 | 131 |
| heat resistance rating |  | C | A | C | C | B | C | B |
| amount of warping [mm] |  | <1 | 3.5 | <1 | <1 | <1 | <1 | <1 |
| rating of low-warp behavior |  | A | C | A | A | A | A | A |

Examples II-1 to II-5 and Comparative Examples II-1 to II-6

The following Table 3 provides the components that were used.

TABLE 3

| component | designation | |
|---|---|---|
| polyalkylene terephthalate (A) | A1 | polybutylene terephthalate resin IV = 0.70, Mw = 45,300 |
|  | A2 | polybutylene terephthalate resin IV = 1.20, Mw = 91,200 |
| polystyrene or HIPS (B) | B1 | HIPS (rubber-reinforced polystyrene) melt viscosity (250° C., 912 sec⁻¹) = 132 Pa·s Mw = 190,000 |
|  | B2 | HIPS (rubber-reinforced polystyrene) melt viscosity (250° C., 912 sec⁻¹) = 73 Pa·s Mw = 140,000 |
|  | B3 | polystyrene melt viscosity (250° C., 912 sec⁻¹) = 115 Pa·s Mw = 380,000 |
| styrene-acrylonitrile copolymer | BX | styrene-acrylonitrile copolymer having a melt viscosity at 250° C. and 912 sec⁻¹ of 244 Pa·s Mw = 325,000 |
| compatibilizer (C) | C1 | "Iupilon H4000" polycarbonate resin Mitsubishi Engineering-Plastics Corporation Mv = 16,000 |
|  | C2 | styrene-maleic anhydride copolymer "XIRAN SZ08250", Polyscope Polymers BV |
| glass fiber (D) | D | "T-187", Nippon Electric Glass Co., Ltd. |
| talc | E | "NLC92RC", Nippon Talc Co., Ltd. |
| phosphorus stabilizer | F1 | octadecyl acid phosphate "AX-71", ADEKA Corporation |
| phenolic stabilizer | F2 | hindered phenolic oxidation inhibitor "AO-60", ADFKA Corporation |
| mold release agent | F3 | montanic acid wax "Licowax E", Clariant AG |
| carton black MB | F4 | carton black masterbatch polybutylene terephthalate base/ CB concentration = 19% |

Using the proportions (mass parts in all instances) given in the following Table 4, the components given in the preceding Table 3 were mixed to uniformity using a tumbler mixer. This was followed by melt-kneading using a twin-screw extruder ("TEX30α", L/D=42, The Japan Steel Works, Ltd.) and conditions of a cylinder set temperature of 260° C., an extrusion rate of 40 kg/h, and a screw rotation rate of 200 rpm, to provide a resin composition. The resin composition was quenched in a water bath and was pelletized using a pelletizer to yield pellets of a thermoplastic resin composition.

The melt flow volume MVR per unit time (unit: cm³/10 min) was measured proceeding as in Example I.

The pellets obtained as described above were dried for 5 hours at 120° C. and were then injection molded using an injection molder from The Japan Steel Works, Ltd. (mold clamping force=85T) under conditions of a cylinder temperature of 250° C. and a mold temperature of 80° C. to give ISO multipurpose test specimens (thickness=4 mm), and the tensile strength at break, the tensile elongation at break, the maximum bending strength, the bending modulus, and the notched Charpy impact strength were measured proceeding as in Example I.

[Deflection Temperature Under Load and Heat Resistance Rating]

Using the aforementioned ISO multipurpose test specimen (thickness=4 mm), the deflection temperature under load was measured based on ISO 75-1 and ISO 75-2 using a load condition of 1.80 MPa.

The heat resistance was rated using the following criteria.

A: the deflection temperature under load is equal to or greater than 150° C.

B: the deflection temperature under load is equal to or greater than 130° C. and less than 150° C.

C: the deflection temperature under load is less than 130° C.

[Amount of Warping and Warping Rating]

A 1.6 mm-thick disk having a diameter of 100 mm was molded using an injection molder ("NEX80", Nissei Plastic Industrial Co., Ltd.), a side-gate mold, and conditions of a cylinder temperature of 260° C. and a mold temperature of 80° C., and the amount of warping (unit: nm) of the disk was determined.

The warping was evaluated and rated using the following criteria.

A: the amount of warping is less than 1 mm

B: the amount of warping is equal to or greater than 1 mm and less than 3 mm

C: the amount of warping is equal to or greater than 3 mm

These results are given in the following Table 4.

Examples III-1 to III-3 and Comparative Examples III-1 to III-5

The following Table 5 provides the components that were used.

TABLE 5

| component | designation | |
|---|---|---|
| polyalkylene terephthalate (A) | A1 | polybutylene terephthalate resin IV = 0.70 dl/g |
| | A2 | polybutylene terephthalate resin IV = 0.60 dl/g polybutylene terephthalate resin IV = 1.20 dl/g |
| polystyrene or HIPS (B) | B1 | HIPS (rubbet-reinforced polystyrene) melt viscosity (250° C., 912 sec$^{-1}$) = 132 Pa · s |
| | BX | polystyrene melt viscosity(250° C., 912 sec$^{-1}$) = 64 Pa · s |
| glass filer (D) | D1 | glass fiber long diameter = 28 μm, short diameter = 7 μm aspect ratio = 4 cross-sectional area = 196 μm$^2$ |
| | DX | glass fiber long diameter = 13 μm, short diameter = 13 μm aspect ratio = 1 cross-sectional area = 133 μm$^2$ |
| compatibilizer (C) | C | "Iupilon H4000"" polycarbonate resin Mitsubishi Engineering-Plastics Corporation Mv = 16,000 |
| phosphorus stabilizer | E1 | octadecyl acid phosphate "AX-71", ADEKA Corporation |

TABLE 4

| | | | Example II- | | | | | Comparative Example II- | | | | |
|---|---|---|---|---|---|---|---|---|---|---|---|---|
| | | | 1 | 2 | 3 | 4 | 5 | 1 | 2 | 3 | 4 | 5 | 6 |
| polyalkylene terephthalate | Mw$_A$ 45300 91200 | A1 A2 | 33.33 | 42.85 | 39.60 | 47.36 | 38.03 | 39.60 | 72.97 | 33.33 | 15.79 | 29.04 | 38.02 |
| polystyrene or HIPS | Mw$_B$ 190000 140000 380000 | B1 B2 B3 | 66.67 | 57.15 | 60.40 | 52.64 | 61.97 | 60.40 | 27.03 | 66.67 | 84.21 | 70.96 | |
| styrene-acnylonitrile copolymer | 320000 | BX | | | | | | | | | | | 61.98 |
| compatibilizer | | C1 C2 | 11.11 | 14.30 | 12.31 | 5.28 | 12.68 | 12.31 | 6.11 | 11.11 | 5.26 | 29.02 | 12.68 |
| glass fiber | | D | 49.16 | 50.57 | 57.01 | 46.58 | 49.86 | 57.01 | 47.69 | 49.16 | 46.58 | 57.09 | 49.78 |
| talc | | E | | | 19.00 | | | 19.00 | | | | | |
| phosphorus stabilizer | | F1 | 0.16 | 0.17 | 0.19 | 0.16 | 0.17 | 0.19 | 0.16 | 0.16 | 0.16 | 0.19 | |
| phenolic stabilizer | | F2 | 0.49 | 0.51 | 0.57 | 0.47 | 0.50 | 0.57 | 0.48 | 0.49 | 0.47 | 0.57 | 0.50 |
| mold release agent | | F3 | 0.82 | 0.84 | 0.95 | 0.78 | 0.83 | 0.95 | 0.48 | 0.82 | 0.78 | 0.95 | 0.83 |
| carbon black MB | | F4 | 2.13 | 2.19 | 2.47 | 2.02 | 2.16 | 2.47 | 2.07 | 2.13 | 2.02 | 2.47 | 2.16 |
| C/A | | | 0.33 | 0.33 | 0.31 | 0.11 | 0.33 | 0.31 | 0.11 | 0.33 | 0.33 | 1.00 | 0.33 |
| [quantity ratio of B/Mw$_B$]/[quantity ratio of A/Mw$_A$] | | | 0.48 | 0.32 | 0.36 | 0.26 | 0.19 | 0.73 | 0.08 | 0.62 | 1.27 | 0.58 | 0.23 |
| MVR [cm$^3$/10 min] | | | 48.5 | 51.5 | 38.4 | 50.4 | 49.2 | 11.6 | 62.1 | 83.3 | 40.7 | 45.5 | 64.0 |
| tensile strength at break [MPa] | | | 103 | 111 | 109 | 108 | 110 | 96 | 113 | 95 | 88 | 105 | 118 |
| tensile elongation at break [%] | | | 2 | 2 | 2 | 2 | 2 | 2 | 2 | 2 | 1 | 2 | 2 |
| maximum bending strength [MPa] | | | 162 | 171 | 170 | 168 | 175 | 168 | 175 | 165 | 150 | 166 | 160 |
| bending modulus [MPa] | | | 8875 | 9022 | 11085 | 9050 | 10220 | 11229 | 8920 | 8902 | 8750 | 8924 | 10376 |
| notched Charpy impact strength [kJ/m$^2$] | | | 9.8 | 9.8 | 9.5 | 9.5 | 10.2 | 7.7 | 10 | 8.3 | 8.7 | 11 | 7.9 |
| deflection temperature under load [° C.] | | | 154 | 167 | 176 | 167 | 162 | 120 | 185 | 128 | 106 | 129 | 129 |
| heat resistance rating | | | A | A | A | A | A | C | A | C | C | C | C |
| amount of warping [mm] | | | <1 | <1 | <1 | <1 | <1 | <1 | 3.5 | <1 | <1 | <1 | <1 |
| rating of low-warp behavior | | | A | A | A | A | A | A | C | A | A | A | A |

TABLE 5-continued

| component | designation | |
|---|---|---|
| phenolic stabilizer | E2 | hindered phenolic oxidation inhibitor" AO-60", ADEKA Corporation |
| mold release agent | F | montanic acid wax "Licowax E", Clariant AG |
| carbon black MB | G | carbon black masterbatch polybutylene terephthalate base/ CB concentration = 19% |

Using the proportions (mass parts in all instances) given in the following Table 6, the components given in the preceding Table 5, with the exception of the glass fiber, were mixed to uniformity using a tumbler mixer. A resin composition was then prepared by melt-kneading using a twin-screw extruder ("TEX30α", L/D=42, The Japan Steel Works, Ltd.) and conditions of a cylinder set temperature of 260° C., an extrusion rate of 40 kg/h, and a screw rotation rate of 200 rpm, with the glass fiber being fed from a side feeder. The resin composition was quenched in a water bath and was pelletized using a pelletizer to yield pellets of a thermoplastic resin composition.

The melt flow volume MVR per unit time (unit: cm$^3$/10 min) was measured proceeding as in Example I.

The pellets obtained as described above were dried for 5 hours at 120° C. and were then injection molded using an injection molder from The Japan Steel Works, Ltd. (mold clamping force=85T) under conditions of a cylinder temperature of 250° C. and a mold temperature of 80° C. to give an ISO multipurpose test specimen (thickness=4 mm), and the tensile strength at break, the tensile elongation at break, the maximum bending strength, the bending modulus, and the notched Charpy impact strength were measured proceeding as in Example I.

[Observation of Morphology]

Using an "APO-120" from Refine Tec Ltd., a smooth flat cross section was obtained by polishing from a cross section perpendicular to the flow direction during molding, that was located in the center of the ISO multipurpose test specimen (thickness=4 mm) obtained as described above and was centered on a location 1,000 μm from the surface layer. The observation surface of the obtained specimen was ion etched for 6 minutes using a "PIB-10" from Vacuum Device Co., Ltd. The etched surface was stained for 30 minutes at room temperature in the vapor phase with osmium tetroxide followed by staining for 120 minutes at room temperature in the vapor phase with ruthenium tetroxide. The SEM image was then acquired at a magnification of 1,000× using a scanning electron microscope ("S4800", Hitachi High-Technologies Corporation) and an acceleration voltage condition of 0.7 kV.

Observation of the resulting SEM image was used to determine whether the glass fiber (D) was present in a state surrounded by the polybutylene terephthalate resin (A) phase or was present surrounded by or dispersed in the polystyrene resin or rubber-reinforced polystyrene resin (B).

FIG. 1 gives, as a representative example of the obtained SEM images, the SEM image of the thermoplastic resin composition obtained in Example III-1.

In FIG. 1, the regions seen in white represent the glass fiber (D), the black regions represent the polystyrene resin or rubber-reinforced polystyrene resin (B), and the grey regions represent the polybutylene terephthalate resin (A), and it is shown here that the glass fiber is surrounded by a polybutylene terephthalate resin layer.

In the table, an "A" indicates that the glass fiber (D) is present in a state of being surrounded by the polybutylene terephthalate resin (A) phase while a "B" indicates that the glass fiber is present surrounded by or dispersed in the polystyrene resin or rubber-reinforced polystyrene resin (B).

[Deflection Temperature Under Load and Heat Resistance Rating]

Using the aforementioned ISO multipurpose test specimen (thickness=4 mm), the deflection temperature under load was measured based on ISO 75-1 and ISO 75-2 using a load condition of 1.80 MPa.

The heat resistance was rated using the following criteria.

A: the deflection temperature under load is equal to or greater than 170° C.

B: the deflection temperature under load is equal to or greater than 160° C. and less than 170° C.

C: the deflection temperature under load is less than 160° C.

[Amount of Warping and Warping Rating]

A 1.6 mm-thick disk having a diameter of 100 mm was molded using an injection molder ("NEX80", Nissei Plastic Industrial Co., Ltd.), a side-gate mold, and conditions of a cylinder temperature of 260° C. and a mold temperature of 80° C., and the amount of warping (unit: nm) of the disk was determined.

The warping was evaluated and rated using the following criteria.

A: the amount of warping is less than 1 mm

B: the amount of warping is equal to or greater than 1 mm and less than 2 mm

C: the amount of warping is equal to or greater than 2 mm

These results are given in the following Table 6.

TABLE 6

| | | Example III- | | | Comparative Example III- | | | | |
|---|---|---|---|---|---|---|---|---|---|
| | | 1 | 2 | 3 | 1 | 2 | 3 | 4 | 5 |
| polyalkylene terephthalate | A1 | 33.27 | | | | 92.04 | 100 | 100 | 33.33 |
| | A2 | | 28.76 | 33.33 | | | | | |
| | A3 | | | | 33.27 | | | | |
| polystyrene or HIPS | B1 | 66.73 | 71.24 | 66.67 | 66.73 | 7.96 | | | |
| | BX | | | | | | | | 66.67 |
| glass fiber | D1 | 76.75 | 75.84 | 49.16 | 76.75 | 47.77 | 44.25 | | 49.16 |
| | DX | | | | | | | 44.25 | |
| compatibilizer | C | 11.09 | 9.59 | 11.11 | 11.09 | 7.96 | | | 11.08 |
| phosphorus stabilizer | E1 | 0.19 | 0.19 | 0.16 | 0.19 | 0.16 | 0.15 | 0.15 | 0.16 |

TABLE 6-continued

|  |  | Example III- | | | Comparative Example III- | | | | |
| --- | --- | --- | --- | --- | --- | --- | --- | --- | --- |
|  |  | 1 | 2 | 3 | 1 | 2 | 3 | 4 | 5 |
| phenolic stabilizer | E2 | 0.58 | 0.57 | 0.49 | 0.58 | 0.48 | 0.44 | 0.44 | 0.49 |
| mold release agent | F | 0.96 | 0.95 | 0.82 | 0.58 | 0.80 | 0.74 | 0.74 | 0.82 |
| carbon black MB | G | 2.49 | 2.46 | 2.13 | 2.49 | 2.07 | 1.92 | 1.92 | 2.13 |
| resin phase in which glass fiber is dispersed | | A | A | A | A | A | A | A | A |
| MVR [cm$^3$/10 min] | | 35.1 | 30 | 55.5 | 15.5 | 56.5 | 46.1 | 35.5 | 72.8 |
| tensile strength at break [MPa] | | 126 | 123 | 107 | 130 | 142 | 150 | 141 | 105 |
| tensile elongation at break [%] | | 2 | 3 | 2 | 2 | 2 | 3 | 3 | 2 |
| maximum bending strength [MPa] | | 196 | 189 | 171 | 199 | 205 | 225 | 215 | 170 |
| bending modulus [MPa] | | 11701 | 11543 | 8865 | 11805 | 9015 | 8905 | 9010 | 8720 |
| notched Charpy impact strength [kJ/m$^2$] | | 13 | 13 | 11.1 | 13.5 | 12.5 | 12.3 | 10.2 | 10.3 |
| deflection temperature under load [° C.] | | 176 | 172 | 170 | 141 | 179 | 206 | 207 | 135 |
| heat resistance rating | | A | A | A | C | A | A | A | C |
| amount of warping [mm] | | <1 | <1 | <1 | <1 | 2.1 | 3 | 6.2 | <1 |
| rating of low-warp behavior | | A | A | A | A | C | C | C | A |

Examples IV-1 to IV-6 and Comparative Examples IV-1 to IV-6

The following Table 7 provides the components that were used.

TABLE 7

| component | designation | |
| --- | --- | --- |
| polyalkylene terephthalate (A) | A1 | polybutylene terephthalate resin IV = 0.70 dl/g |
| | A2 | polybutylene terephthalate resin IV = 0.60 dl/g |
| | AX | polybutylene terephthalate resin IV = 1.20 dl/g |
| polystyrene or HIPS (B) | B1 | HIPS (rubber-reinforced polystyrene) melt viscosity (250° C., 912 sec$^{-1}$) = 132 Pa·s |
| | BX | polystyrene melt viscosity (250° C., 912 sec$^{-1}$) = 64 Pa·s |
| brominated flame retardant | E1 | brominated phthalimide "BT-93W", Albemarle Corporation |
| | E2 | polypentabromobenzyl acrylate "FR-1025", ICL |
| | E3 | brominated polycarbonate "FR-53", Mitsubishi Gas Chemical Company, Inc. |
| | E4 | brominated polystyrene "PBS-64HW", Lanxess |
| | E5 | brominated epoxy "CXB-2000H", Ujin Co., Ltd. |
| antimony compound | F | antimony trioxide "AT-3CN", Suzuhiro Chemical Co., Ltd. |
| compatibilizer (C) | C | "Iupilon H4000" polycarbonate resin Mitsubishi Engineering-Plastics Corporation Mv = 16,000 |
| glass fiber (D) | D | glass fiber from E glass "T-187", Nippon Electric Glass Co., Ltd. |
| inorganic filler | G | talc "5000A", Hayashi Kasei Co., Ltd. |
| phosphorus stabilizer | H1 | octadecyl acid phosphate "AX-71", ADEKA Corporation |
| phenolic stabilizer | H2 | hindered phenolic oxidation inhibitor "AO-60", ADEKA Corporation |
| mold release agent | J | montanic acid wax "Licowax E", Clariant AG |
| carbon black MB | K | carbon black masterbatch polybutylene terephthalate base/ CB concentration = 19 mass % |

Using the proportions (mass parts in all instances) given in the following Table 8, the components given in the preceding Table 7, with the exception of the glass fiber, were mixed to uniformity using a tumbler mixer. A resin composition was then prepared by melt-kneading using a twin-screw extruder ("TEX30α", L/D=42, The Japan Steel Works, Ltd.) and conditions of a cylinder set temperature of 260° C., an extrusion rate of 40 kg/h, and a screw rotation rate of 200 rpm, with the glass fiber being fed from a side feeder. The resin composition was quenched in a water bath and was pelletized using a pelletizer to yield pellets of a thermoplastic resin composition.

The melt flow volume MVR per unit time (unit: cm$^3$/10 min) was measured proceeding as in Example I.

In addition, the pellets obtained as described above were dried for 5 hours at 120° C. and were then injection molded using an injection molder from The Japan Steel Works, Ltd. (mold clamping force=85T) under conditions of a cylinder temperature of 250° C. and a mold temperature of 80° C. to give an ISO multipurpose test specimen (thickness=4 mm), and the tensile strength at break, the tensile elongation at break, the maximum bending strength, the bending modulus, and the notched Charpy impact strength were measured proceeding as in Example I.

[Deflection Temperature Under Load and Heat Resistance Rating]

Using the aforementioned ISO multipurpose test specimen (thickness=4 mm), the deflection temperature (unit: ° C.) under load was measured based on ISO 75-1 and ISO 75-2 using a load condition of 1.8 MPa.

The heat resistance was rated using the following criteria.

A: the deflection temperature under load is equal to or greater than 140° C.

B: the deflection temperature under load is equal to or greater than 130° C. and less than 140° C.

C: the deflection temperature under load is less than 130° C.

[Amount of Warping and Rating of the Low-Warp Behavior]

A 1.6 mm-thick disk having a diameter of 100 mm was molded using an injection molder ("NEX80", Nissei Plastic Industrial Co., Ltd.), a side-gate mold, and conditions of a cylinder temperature of 260° C. and a mold temperature of 80° C., and the amount of warping (unit: nm) of the disk was determined.

The low-warp behavior was evaluated and rated using the following criteria.

A: the amount of warping is less than 1 mm

B: the amount of warping is equal to or greater than 1 mm and less than 3 mm

C: the amount of warping is equal to or greater than 3 mm

[Flame Retardancy (UL-94)]

The combustibility (flame retardancy) was tested, based on the method of Subject 94 of Underwriters Laboratories (UL-94), on 5 test specimens (thickness: 1.6 mm).

The combustibility was classified into V-0, V-1, V-2, and NR (nonconforming) according to the evaluation method in UL-94.

These results are given in the following Table 8.

TABLE 8

| | | Example IV- | | | | | |
|---|---|---|---|---|---|---|---|
| | | 1 | 2 | 3 | 4 | 5 | 6 |
| polyalkylene terephthalate | A1 | 35.08 | 35.03 | 35.08 | 35.08 | 35.08 | |
| | A2 | | | | | | 35.08 |
| | AX | | | | | | |
| polystyrene or HIPS | B1 | 64.92 | 64.92 | 64.92 | 64.92 | 64.92 | 64.92 |
| | BX | | | | | | |
| brominated flame retardant | E1 | 21.63 | | | | | 21.63 |
| | E2 | | 21.63 | | | | |
| | E3 | | | 21.63 | | | |
| | E4 | | | | 21.63 | | |
| | E5 | | | | | 21.63 | |
| Sb compound | F | 5.17 | 5.17 | 5.17 | 5.17 | 5.17 | 5.17 |
| compatibilizer | C | 10.82 | 10.82 | 10.82 | 10.82 | 10.82 | 10.82 |
| glass fiber | D | 61.80 | 61.80 | 61.80 | 61.80 | 61.80 | 61.80 |
| inorganic filler | G | 2.06 | 2.06 | 2.06 | 2.06 | 2.06 | 2.06 |
| phosphorus stabilizer | H1 | 0.21 | 0.21 | 0.21 | 0.21 | 0.21 | 0.21 |
| phenolic stabilizer | H2 | 0.62 | 0.62 | 0.62 | 0.62 | 0.62 | 0.62 |
| mold release agent | J | 1.03 | 1.03 | 1.03 | 1.03 | 1.03 | 1.03 |
| carbon black MB | K | 2.68 | 2.68 | 2.68 | 2.68 | 2.68 | 2.68 |
| MVR[cm$^3$/10 min] | | 25.7 | 37.1 | 32.6 | 30.9 | 32.6 | 36.1 |
| tensile strength at break [MPa] | | 100 | 102 | 102 | 99 | 98 | 100 |
| tensile elongation at break (%) | | 2 | 2 | 2 | 2 | 2 | 2 |
| maximum bending strength [MPa] | | 156 | 158 | 164 | 158 | 153 | 155 |
| bending modulus [MPa] | | 10651 | 10164 | 10164 | 10200 | 10167 | 10660 |
| notched Charpy impact strength [kJ/m$^2$] | | 8.2 | 8.8 | 8.3 | 7.8 | 7.6 | 8.3 |
| deflection temperature under load [C°.] | | 147 | 142 | 133 | 130 | 132 | 151 |
| heat resistance rating | | A | A | B | B | B | A |
| amount of warping [mm] | | <1 | <1 | <1 | <1 | <1 | <1 |
| rating of low-warp behavior | | A | A | A | A | A | A |
| flame retardancy (1.6 mmt) | | V-0 | V-0 | V-0 | V-0 | V-0 | V-0 |

| | | Comparative Example IV- | | | | | |
|---|---|---|---|---|---|---|---|
| | | 1 | 2 | 3 | 4 | 5 | 6 |
| polyalkylene terephthalate | A1 | | 35.08 | 83.94 | | 100 | 100 |
| | A2 | | | | | | |
| | AX | 35.08 | | | 83.94 | | |
| polystyrene or HIPS | B1 | 64.92 | | 16.06 | 16.06 | | |
| | BX | | 64.92 | | | | |
| brominated flame retardant | E1 | 21.63 | 21.63 | | | 21.63 | |
| | E2 | | | 21.08 | 21.08 | | |
| | E3 | | | | | | |
| | E4 | | | | | | |
| | E5 | | | | | | 21.63 |
| Sb compound | F | 5.17 | 5.17 | 11.04 | 11.04 | 5.17 | 5.17 |
| compatibilizer | C | 10.82 | 10.82 | 4.02 | 4.02 | | |
| glass fiber | D | 61.80 | 61.80 | 60.24 | 60.24 | 61.80 | 61.80 |
| inorganic filler | G | 1.03 | 0.62 | | | 2.06 | 2.06 |
| phosphorus stabilizer | H1 | 0.21 | 0.21 | 0.20 | 0.20 | 0.21 | 0.21 |
| phenolic stabilizer | H2 | 0.62 | 0.62 | 0.60 | 0.60 | 0.62 | 0.62 |
| mold release agent | J | 1.03 | 0.62 | 1.00 | 1.00 | 1.03 | 1.03 |
| carbon black MB | K | 2.68 | 2.68 | 2.61 | 2.61 | 2.68 | 2.68 |
| MVR[cm$^3$/10 min] | | 13.1 | 73 | 29.2 | 12.3 | 35.5 | 39.1 |
| tensile strength at break [MPa] | | 95 | 112 | 125 | 126 | 141 | 136 |
| tensile elongation at break (%) | | 2 | 2 | 2 | 2 | 3 | 2 |
| maximum bending strength [MPa] | | 153 | 155 | 195 | 197 | 215 | 213 |

TABLE 8-continued

| | | | | | | |
|---|---|---|---|---|---|---|
| bending modulus [MPa] | 11937 | 11025 | 9800 | 9820 | 9010 | 8720 |
| notched Charpy impact strength [kJ/m²] | 7.7 | 8.1 | 10.1 | 10.5 | 10.2 | 10.3 |
| deflection temperature under load [C°.] | 105 | 101 | 192 | 193 | 205 | 206 |
| heat resistance rating | C | C | A | A | A | A |
| amount of warping [mm] | <1 | <1 | 2.4 | 2.5 | 3.1 | 3.2 |
| rating of low-warp behavior | A | A | C | C | C | C |
| flame retardancy (1.6 mmt) | V-0 | V-0 | V-0 | V-0 | V-0 | V-0 |

Examples V-1 to V-5 and Comparative Examples V-1 to V-4

The following Table 9 provides the components that were used.

TABLE 9

| component | designation | |
|---|---|---|
| polyalkylene terephthalate (A) | A1 | polybutylene terephthalate resin IV = 0.70 dl/g |
| | A2 | polybutylene terephthalate resin IV = 0.60 dl/g |
| | AX | polybutylene terephthalate resin IV = 1.20 dl/g |
| polystyrene or HIPS (B) | B1 | HIPS (rubber-reinforced polystyrene) melt viscosity (250° C., 912 sec⁻¹) = 132 Pa · s |
| | BX | polystyrene melt viscosity (250° C., 912 sec⁻¹) = 64 Pa · s |
| carton titer | G | "TR06UL", Mitsubishi Chemical Corporation average fiber diameter = 6 μm |
| compatibilizer | C | "Iupilon H4000" polycarbonate resin Mitsubishi Engineering-Plastics Corporation Mv = 16,000 |
| brominated flame retardant | E | brominated phthalimide "BT-93W", Albemarle Corporation |
| antimony compound | F | antimony trioxide "AT3CN", Suzuhiro Chemical Co., Ltd. |
| PTFE | H | polytetrafluoroethylene "TF-1750", 3M Corporation |
| talc | I | "5000A", Hayashi Kasei Co., Ltd. |
| phosphorus stabilizer | J1 | octadecyl acid phosphate "AX-71", ADEKA Corporation |
| phenolic stabilizer | J2 | hindered phenolic oxidation inhibitor " AO-60", ADEKA Corporation |
| flame retardant | K | montanic acid wax "Licowax E", Clariant AG |
| carbon black MB | L | carbon black masterbatch polybutylene terephthalate base/ CB concentration = 19% |

Using the proportions (mass parts in all instances) given in the following Table 10, the components given in Table 9 above, with the exception of the carbon fiber, were mixed to uniformity using a tumbler mixer. A resin composition was then prepared by melt-kneading using a twin-screw extruder ("TEX30α", L/D=42, The Japan Steel Works, Ltd.) and conditions of a cylinder set temperature of 260° C., an extrusion rate of 40 kg/h, and a screw rotation rate of 200 rpm, with the carbon fiber being fed from a side feeder. The resin composition was quenched in a water bath and was pelletized using a pelletizer to yield pellets of a thermoplastic resin composition.

The melt flow volume MVR per unit time (unit: cm³/10 min) was measured proceeding as in Example I.

The pellets obtained as described above were dried for 5 hours at 120° C. and were then injection molded using an injection molder from The Japan Steel Works, Ltd. (mold clamping force=85T) under conditions of a cylinder temperature of 250° C. and a mold temperature of 80° C. to give an ISO multipurpose test specimen (thickness=4 mm), and the tensile strength at break, the tensile elongation at break, the maximum bending strength, the bending modulus, and the notched Charpy impact strength were measured proceeding as in Example I.

[Deflection Temperature Under Load and Heat Resistance Rating]

Using the aforementioned ISO multipurpose test specimen (thickness=4 mm), the deflection temperature (unit: ° C.) under load was measured based on ISO 75-1 and ISO 75-2 using a load condition of 0.45 MPa.

The heat resistance was rated using the following criteria.

A: the deflection temperature under load is equal to or greater than 150° C.

B: the deflection temperature under load is equal to or greater than 130° C. and less than 150° C.

C: the deflection temperature under load is less than 130° C.

[Amount of Warping and Rating of the Low-Warp Behavior]

A 1.6 m-thick disk having a diameter of 100 m was molded using an injection molder ("NEX80", Nissei Plastic Industrial Co., Ltd.), a side-gate mold, and conditions of a cylinder temperature of 260° C. and a mold temperature of 80° C., and the amount of warping (unit: mm) of the disk was determined.

The low-warp behavior was evaluated and rated using the following criteria.

A: the amount of warping is less than 1 m

B: the amount of warping is equal to or greater than 1 mm and less than 3 m

C: the amount of warping is equal to or greater than 3 mm

These results are given in Table 10 below.

TABLE 10

| | | Example V- | | | | | Comparative Example V- | | | |
|---|---|---|---|---|---|---|---|---|---|---|
| | | 1 | 2 | 3 | 4 | 5 | 1 | 2 | 3 | 4 |
| polybutylene terephthalate | A1 | 38.02 | 33.33 | 33.33 | | 39.53 | | | 33.33 | 100 |
| | A2 | | | | 33.33 | | | | | |
| | AX | | | | | | 38.02 | 33.33 | | |
| polystyrene or HIPS | B1 | 61.98 | 66.67 | 66.67 | 66.67 | 60.47 | 61.98 | 66.67 | | |
| | BX | | | | | | | | 66.67 | |

TABLE 10-continued

|  |  | Example V- | | | | | Comparative Example V- | | | |
| --- | --- | --- | --- | --- | --- | --- | --- | --- | --- | --- |
|  |  | 1 | 2 | 3 | 4 | 5 | 1 | 2 | 3 | 4 |
| carbon fiber | G | 12.67 | 12.50 | 28.17 | 12.50 | 15.10 | 12.67 | 12.66 | 12.66 | 11.26 |
| compatibilizer | C | 12.67 | 11.11 | 11.11 | 11.11 | 12.37 | 12.67 | 11.11 | 11.11 |  |
| brominated flame retardant | E |  |  |  |  | 13.59 |  |  |  |  |
| Sb compound | F |  |  |  |  | 5.44 |  |  |  |  |
| PTFE | H |  |  |  |  | 0.45 |  |  |  |  |
| talc | I |  |  |  |  | 0.76 |  |  |  |  |
| phosphorus stabilizer | J1 | 0.13 | 0.12 | 0.14 | 0.12 | 0.15 | 0.13 | 0.13 | 0.13 |  |
| phenolic stabilizer | J2 | 0.38 | 0.37 | 0.42 | 0.37 | 0.45 | 0.38 | 0.38 | 0.38 | 0.34 |
| mold release agent | K | 0.63 | 0.62 | 0.70 | 0.62 | 0.76 | 0.63 | 0.38 | 0.63 | 0.56 |
| carbon black MB | L | 1.65 | 1.62 | 1.83 | 1.62 | 1.96 | 1.65 | 1.65 | 1.65 | 1.46 |
| MVR [cm$^3$/10 min] |  | 13.6 | 12.5 | 4.6 | 15.8 | 7.5 | 4.2 | 4.4 | 36.2 | 26 |
| specific gravity [g/cm$^3$] |  | 1.17 | 1.16 | 1.2 | 1.16 | 1.28 | 1.18 | 1.16 | 1.17 | 1.35 |
| tensile strength at break [MPa] |  | 115 | 114 | 152 | 113 | 110 | 110 | 107 | 108 | 133 |
| tensile elongation at break (%) |  | 2 | 2 | 2 | 2 | 2 | 2 | 2 | 2 | 3 |
| maximum bending strength [MPa] |  | 168 | 164 | 225 | 164 | 169 | 168 | 164 | 166 | 199 |
| bending modulus [MPa] |  | 8284 | 8497 | 14689 | 8410 | 9285 | 9053 | 8879 | 8920 | 8787 |
| notched Charpy impact strength [kJ/m$^2$] |  | 4.8 | 4.7 | 6.7 | 4.7 | 4.5 | 4.9 | 4.9 | 4.5 | 3.6 |
| deflection temperature under load [° C.] |  | 201 | 198 | 206 | 202 | 204 | 164 | 139 | 145 | 220 |
| heat resistance rating |  | A | A | A | A | A | C | C | C | A |
| amount of warping [mm] |  | <1 | <1 | <1 | <1 | <1 | <1 | <1 | <1 | 3.3 |
| rating of low-warp behavior |  | A | A | A | A | A | A | A | A | C |

INDUSTRIAL APPLICABILITY

The thermoplastic resin composition according to the present invention has a high heat resistance, an excellent low-warp behavior and appearance, as well as an excellent mechanical strength, chemical resistance, and flame retardancy and is thus suitably used in particular for electrical and electronic device parts and automotive internal and external parts and electrical equipment parts, where such properties are rigorously required.

The invention claimed is:

1. A thermoplastic resin composition, comprising, relative to a total mass of (A) and (B) being 100 parts by mass:
   (A) a polyalkylene terephthalate resin in a range of from 20 to less than 50 parts by mass, the polyalkylene terephthalate (A) comprising more than 50 mass % polybutylene terephthalate, based on total polyalkylene terephthalate (A) mass, and
   (B) a polystyrene resin or a rubber-reinforced polystyrene resin in a range of from more than 50 to 80 parts by mass,
   wherein an intrinsic viscosity (IV$_A$) of the polyalkylene terephthalate resin (A) is in a range of from 0.3 to 0.8 dl/g, and
   wherein a melt viscosity (η$_B$) of the polystyrene resin or rubber-reinforced polystyrene resin (B) at 250° C. and 912 sec$^{-1}$ is at least 80 Pa·sec.

2. The thermoplastic resin composition of claim 1, further comprising:
   (C) a compatibilizer in a range of from 1 to 25 parts by mass, relative to the total mass of (A) and (B) being 100 parts by mass.

3. The thermoplastic resin composition of claim 1, further comprising:
   (C) a compatibilizer comprising a polycarbonate resin and/or a styrene-maleic acid copolymer.

4. The thermoplastic resin composition of claim 3,
   wherein a mass-average molecular weight (Mw$_A$) of the polyalkylene terephthalate resin (A) is in a range of from 20,000 to 65,000,
   wherein a mass-average molecular weight (Mw$_B$) of the polystyrene resin or rubber-reinforced polystyrene resin (B) is in a range of from 150,000 to 500,000, and
   wherein a (C)/(A) mass ratio, between the polycarbonate resin and/or styrene-maleic acid copolymer (C) and the polyalkylene terephthalate resin (A) is in a range of from 0.1 to 0.7.

5. The thermoplastic resin composition of claim 4, satisfying inequality (II)

$$0.1 \leq [\text{quantity ratio of } (B)/\text{Mw}_B]/[\text{quantity ratio of } (A)/\text{Mw}_A] \leq 0.7 \quad (II)$$

wherein
   MW$_A$ is the mass-average molecular weight of the polyalkylene terephthalate resin (A),
   a quantity ratio of (A) is an (A)/((A)+(B)) mass ratio of the polyalkylene terephthalate resin (A) to the total mass of the polyalkylene terephthalate resin (A) and the polystyrene resin or rubber-reinforced polystyrene resin (B),
   MW$_B$ is the mass-average molecular weight of the polystyrene resin or rubber-reinforced polystyrene resin (B), and
   a quantity ratio of (B) is a (B)/((A)+(B)) mass ratio of the polystyrene resin or rubber-reinforced polystyrene resin (B) to the total mass of the polyalkylene terephthalate resin (A) and the polystyrene resin or rubber-reinforced polystyrene resin (B).

6. The thermoplastic resin composition of claim 1, further comprising:
   (D) a glass fiber at a concentration of 5 to 150 parts by mass relative to 100 parts by mass of the total of (A) and (B).

7. The thermoplastic resin composition of claim 6, wherein the glass fiber (D) is surrounded by a phase comprising the polyalkylene terephthalate resin (A).

8. The thermoplastic resin composition of claim 6, wherein an aspect ratio of a long direction cross-section of the glass fiber (D) is in a range of from 2 to 6.

9. The thermoplastic resin composition of claim 6, wherein an area of the long direction cross section of the glass fiber (D) is in a range of from greater than 180 to 300 μm$^2$.

10. The thermoplastic resin composition of claim 1, satisfying inequality (I):

$$[\text{quantity ratio of } (A)/\text{IV}_A] \geq [\text{quantity ratio of } (B)/(\eta_B/80)] \quad (I)$$

wherein a quantity ratio of (A) is an (A)/((A)+(B)) mass ratio of the polyalkylene terephthalate resin (A) to the total mass of the polyalkylene terephthalate resin (A) and the polystyrene resin or rubber-reinforced polystyrene resin (B), $\text{IV}_A$ is the intrinsic viscosity of the polyalkylene terephthalate resin (A), $\eta_B$ is the melt viscosity of the polystyrene resin or rubber-reinforced polystyrene resin (B), and a quantity ratio of (B) is a (B)/((A)+(B)) mass ratio of the polystyrene resin or rubber-reinforced polystyrene resin (B) to the total mass of the polyalkylene terephthalate resin (A) and the polystyrene resin or rubber-reinforced polystyrene resin (B).

11. The thermoplastic resin composition of claim 1, further comprising, relative to the total mass of (A) and (B) being 100 parts by mass:

(E) a brominated flame retardant in a range of from more than 10 to 50 parts by mass, and (F) an antimony compound in a range of from more than 0.1 to 30 parts by mass.

12. The thermoplastic resin composition of claim 11, wherein the brominated flame retardant (E) comprises a brominated phthalimide, a brominated polyacrylate, a brominated polycarbonate, a brominated epoxy, and/or a brominated polystyrene.

13. The thermoplastic resin composition of claim 11, further comprising, relative to the total mass of (A) and (B) being 100 parts by mass:

an inorganic filler, comprising talc, mica, wollastonite, kaolin, and/or calcium carbonate, in a range of from more than 0.1 to 20 parts by mass.

14. The thermoplastic resin composition of claim 1, further comprising, relative to the total mass of (A) and (B) being 100 parts by mass:

(G) carbon fiber in a range of from 5 to 100 parts by mass.

15. The thermoplastic resin composition of claim 14, wherein an average fiber diameter of the carbon fiber (G) is not greater than 10 μm.

16. The thermoplastic resin composition of claim 14, which has a specific gravity in a range of from 1.0 to 1.33.

17. The thermoplastic resin composition of claim 1, wherein the polyalkylene terephthalate resin (A) comprises the polybutylene terephthalate resin and a polyethylene terephthalate resin.

18. A molded article, comprising:

the thermoplastic resin composition of claim 1.

19. The molded article of claim 18, which is a housing configured for a device part mounted in an automobile.

20. The molded article of claim 18, which is a connector part suitable for an automotive electrical equipment.

\* \* \* \* \*